US008744729B2

(12) United States Patent
Iwazaki et al.

(10) Patent No.: US 8,744,729 B2
(45) Date of Patent: Jun. 3, 2014

(54) APPARATUS AND METHOD FOR DETECTING ABNORMAL AIR-FUEL RATIO VARIATION AMONG CYLINDERS OF MULTI-CYLINDER INTERNAL COMBUSTION ENGINE

(75) Inventors: Yasushi Iwazaki, Ebina (JP); Toru Kidokoro, Hadano (JP); Hiroshi Sawada, Gotenba (JP); Fumihiko Nakamura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1210 days.

(21) Appl. No.: 12/663,783

(22) PCT Filed: Jul. 23, 2008

(86) PCT No.: PCT/IB2008/001913

§ 371 (c)(1), (2), (4) Date: Dec. 9, 2009

(87) PCT Pub. No.: WO2009/013600

PCT Pub. Date: Jan. 29, 2009

(65) Prior Publication Data

US 2010/0168986 A1 Jul. 1, 2010

(30) Foreign Application Priority Data

Jul. 24, 2007 (JP) ................................. 2007-192474
Sep. 19, 2007 (JP) ................................. 2007-242504

(51) Int. Cl.
*B60T 7/12* (2006.01)
*G05D 1/00* (2006.01)
*G06F 7/00* (2006.01)
*G06F 17/00* (2006.01)

(52) U.S. Cl.
USPC ......... 701/109; 701/103; 123/673; 73/114.72

(58) Field of Classification Search
USPC ............. 123/672, 673, 691; 60/285; 701/103, 701/109, 114; 73/114.71, 114.72, 114.73
See application file for complete search history.

(56) References Cited

U.S. PATENT DOCUMENTS 4,125,374 A 11/1978 Bode et al.
5,069,035 A * 12/1991 Kayanuma ...................... 60/274

(Continued)

FOREIGN PATENT DOCUMENTS

DE 10 2005 044 335 6/2006
DE 10 2005 043 414 3/2007

(Continued)

*Primary Examiner* — Erick Solis
*Assistant Examiner* — Anthony L Bacon
(74) *Attorney, Agent, or Firm* — Oblon, Spivak, McClelland, Maier & Neustadt, L.L.P.

(57) ABSTRACT

An apparatus for detecting abnormal air-fuel ratio variation among cylinders of a multi-cylinder internal combustion engine includes: a catalyst element that oxidizes hydrogen contained in exhaust gas to remove the hydrogen; a first air-fuel ratio sensor that detects an air-fuel ratio of exhaust gas that has not passed through the catalyst element; a second air-fuel ratio sensor that detects an air-fuel ratio of exhaust gas that has passed through the catalyst element; and a unit that determines whether abnormal air-fuel ratio variation among the cylinders has occurred based on an amount by which a value detected by the second air-fuel ratio sensor is leaner than a value detected by the first air-fuel ratio sensor.

27 Claims, 28 Drawing Sheets

(56) References Cited

U.S. PATENT DOCUMENTS

| | | | | |
|---|---|---|---|---|
| 5,867,982 | A | 2/1999 | Tengblad et al. | |
| 6,220,017 | B1 | 4/2001 | Tayama et al. | |
| 6,378,296 | B1 * | 4/2002 | Yasui et al. | 60/277 |
| 7,597,091 | B2 * | 10/2009 | Suzuki et al. | 123/673 |
| 8,047,064 | B2 * | 11/2011 | Iwazaki et al. | 73/114.72 |
| 2002/0112467 | A1 * | 8/2002 | Uranishi | 60/277 |
| 2003/0079730 | A1 | 5/2003 | Fujimoto | |
| 2004/0261402 | A1 * | 12/2004 | Sealy et al. | 60/285 |
| 2007/0012564 | A1 * | 1/2007 | Hayashi et al. | 204/401 |
| 2007/0234708 | A1 * | 10/2007 | Jones et al. | 60/277 |
| 2008/0028745 | A1 | 2/2008 | Katoh et al. | |
| 2009/0019832 | A1 | 1/2009 | Katoh | |
| 2009/0056686 | A1 | 3/2009 | Suzuki | |

FOREIGN PATENT DOCUMENTS

| | | |
|---|---|---|
| JP | 4 318250 | 11/1992 |
| JP | 9 268934 | 10/1997 |
| JP | 11 247687 | 9/1999 |
| JP | 2000 220489 | 8/2000 |
| JP | 2001 124730 | 5/2001 |
| WO | 96 38658 | 12/1996 |
| WO | 2006 093357 | 9/2006 |
| WO | 2007 066209 | 6/2007 |
| WO | 2007 099429 | 9/2007 |

* cited by examiner

APPARATUS AND METHOD FOR DETECTING ABNORMAL AIR-FUEL RATIO VARIATION AMONG CYLINDERS OF MULTI-CYLINDER INTERNAL COMBUSTION ENGINE

BACKGROUND OF THE INVENTION

1. Field of the Invention

The invention relates generally to an apparatus and method for detecting abnormal air-fuel ratio variation among cylinders of a multi-cylinder internal combustion engine. More specifically, the invention relates to an apparatus and method for detecting relatively great air-fuel ratio variation among cylinders of a multi-cylinder internal combustion engine.

2. Description of the Related Art

In an internal combustion engine provided with an exhaust gas control system that uses a catalyst, it is usually necessary to control a mixture ratio between air and fuel, which constitute an air-fuel mixture that is burned in the internal combustion engine, that is, an air-fuel ratio, in order to remove toxic substances in the exhaust gas using the catalyst with high efficiency. To control the air-fuel ratio, an air-fuel ratio sensor is provided in an exhaust passage of the internal combustion engine, and feedback control is executed so that the air-fuel ratio that is detected by the air-fuel ratio sensor matches a predetermined target air-fuel ratio.

In a multi-cylinder internal combustion engine, air-fuel ratio control is usually executed using the same control amount for all the cylinders. Therefore, even if the air-fuel ratio control is executed, the actual air-fuel ratio may vary among the cylinders. If the variation range is narrow, such small air-fuel ratio variation is absorbed by executing the air-fuel ratio feedback control, and toxic substances in the exhaust gas are removed by the catalyst. Therefore, such small air-fuel ratio variation does not exert an influence on the exhaust emission, and, therefore, does not cause a problem. However, if the air-fuel ratio greatly varies among the cylinders due to, for example, a malfunction of a fuel injection system of part of the cylinders, the exhaust emission deteriorates, which may cause a problem. Preferably, such great air-fuel ratio variation that may cause deterioration of the exhaust emission should be detected as an abnormality. Especially, in the case of an internal combustion engine for an automobile, detecting abnormal air-fuel ratio variation among cylinders using an on-board device is required in order to prevent a vehicle that emits deteriorated exhaust emission from running. Recently, there are moves for legislating for provision of an on-board device that detects abnormal air-fuel ratio variation among the cylinders.

Japanese Patent Application Publication No. 04-318250 (JP-A-04-318250) describes an apparatus which determines that a fuel supply system malfunctions when an air-fuel ratio feedback correction coefficient that is used in air-fuel ratio feedback control is equal to or larger than a predetermined value. The apparatus is able to determine that some sort of malfunction has occurred somewhere in the fuel supply system. However, the apparatus is not able to detect abnormal air-fuel ratio variation, that is, abnormal deviation of the air-fuel ratio in at least one cylinder from the air-fuel ratio in the other cylinders.

Japanese Patent Application Publication No. 2000-220489 (JP-A-2000-220489) describes an engine control apparatus that calculates air-fuel ratios in respective cylinders and individually controls the air-fuel ratios in the cylinders, in a multi-cylinder engine in which a single air-fuel ratio sensor is arranged in an exhaust pipe gathering portion of the engine.

The engine control apparatus calculates an air-fuel ratio based on a signal output from the air-fuel ratio sensor, analyzes the calculated air-fuel ratio into frequency components in a predetermined range, and estimates the air-fuel ratios in the respective cylinders based on the analyzed frequency components.

If the air-fuel ratios in the respective cylinders are estimated using, for example, the apparatus described in JP-2000-220489, it may be possible to determine whether abnormal air-fuel ratio variation among the cylinders has occurred by comparing the air-fuel ratios with each other. However, with the apparatus described in JP-A-2000-220489, it is necessary to detect the fluctuations of the air-fuel ratio that is in synchronization with engine rotation in short cycles using the air-fuel ratio sensor. Therefore, a considerably highly-responsive air-fuel ratio sensor is required. Even when such an air-fuel ratio sensor is available, if the sensor deteriorates and therefore the response becomes slower, the sensor may fail to function properly. In addition, a high-speed processing data sample and a powerful ECU are required. It is difficult to separate fluctuations of the air-fuel ratio and noise from each other to detect only the fluctuations of the air-fuel ratio using a highly-responsive sensor. Further, restrictions are imposed on the engine operating condition, for example, the engine operating condition is restricted to the steady operating condition to minimize disturbance. It is preferable to arrange the sensor at a position as close as possible to a combustion chamber in order to detect the fluctuations of the air-fuel ratio that is in synchronization with engine rotation. However, in this case, a crack may be caused in a sensor element due to moisture in the exhaust gas. Therefore, it is necessary to select an exhaust manifold having an appropriate shape and to arrange the sensor at an appropriate position so that the gas contacts the air-fuel ratio sensor appropriately. As described above, even if the air-fuel ratios in the respective cylinders are estimated to determine whether abnormal air-fuel ratio variation among the cylinders has occurred, there are many problems to be solved. Therefore, it is difficult to actually implement the above-described technology.

SUMMARY OF THE INVENTION

The invention provides a practical apparatus and method for accurately detecting abnormal air-fuel ratio variation among cylinders of a multi-cylinder internal combustion engine.

A first aspect of the invention relates to an apparatus for detecting abnormal air-fuel ratio variation among cylinders of a multi-cylinder internal combustion engine. The apparatus includes: a catalyst element that is provided in an exhaust passage of the multi-cylinder internal combustion engine, and that oxidizes at least hydrogen contained in exhaust gas to remove the hydrogen; a first air-fuel ratio sensor that detects a first exhaust gas air-fuel ratio which is an air-fuel ratio of exhaust gas that has not passed through the catalyst element; a second air-fuel ratio sensor that detects a second exhaust gas air-fuel ratio which is an air-fuel ratio of exhaust gas that has passed through the catalyst element; and abnormality determination means for determining whether abnormal air-fuel ratio variation among the cylinders has occurred based on an amount by which a detection value of the second exhaust gas air-fuel ratio is leaner than a detection value of the first exhaust gas air-fuel ratio.

If the air-fuel ratio in part of the cylinders is richer than the stoichiometric air-fuel ratio, the amount of hydrogen in the exhaust gas tends to increase considerably. Meanwhile, when the exhaust gas that contains hydrogen passes through the catalyst element, the hydrogen is oxidized and therefore removed. Therefore, the detection value of the first air-fuel ratio of the exhaust gas, which has not passed through the catalyst element and from which hydrogen has not been removed, is richer than the detection value of the second air-fuel ratio of the exhaust gas, which has passed through the catalyst element and from which hydrogen has been removed, due to the influence of hydrogen. Conversely, the detection value of the second exhaust gas air-fuel ratio is leaner than the detection value of the first exhaust gas air-fuel ratio due to the influence of hydrogen. Therefore, whether abnormal air-fuel ratio variation among the cylinders has occurred is determined based on the amount by which the detection value of the second exhaust gas air-fuel ratio is leaner than the detection value of the first exhaust gas air-fuel ratio (hereinafter, referred to as "lean-deviation" where appropriate). The lean-deviation is larger when the air-fuel ratio in only part of the cylinders is richer than the stoichiometric air-fuel ratio than when the air-fuel ratios in all the cylinders are equally and uniformly richer than the stoichiometric air-fuel ratio. Therefore, the amount of hydrogen in the exhaust gas is larger when the air-fuel ratio in only part of the cylinders is richer than the stoichiometric air-fuel ratio than when the air-fuel ratios in all the cylinders are equally and uniformly richer than the stoichiometric air-fuel ratio. Accordingly, monitoring such lean-deviation makes it possible to distinguish a case where the air-fuel ratio in only part of the cylinders deviates from the stoichiometric air-fuel ratio from a case where the air-fuel ratios in all the cylinders equally deviate from the stoichiometric air-fuel ratio, and determine whether abnormal air-fuel ratio variation has occurred among the cylinders. Therefore, the air-fuel ratio sensor need not be a highly-responsive one. As a result, it is possible to provide the useful apparatus that accurately determines whether abnormal air-fuel ratio variation has occurred among the cylinders.

In the first aspect of the invention, the first air-fuel ratio sensor may be arranged in the exhaust passage at a position upstream of the catalyst element, the second air-fuel ratio sensor may be arranged in the exhaust passage at a position downstream of the catalyst element, and the apparatus may further include air-fuel ratio control means for executing air-fuel ratio control that includes main air-fuel ratio control for bringing the detection value of the first exhaust gas air-fuel ratio to a predetermined first target air-fuel ratio and sub-air-fuel ratio control for bringing the detection value of the second exhaust gas air-fuel ratio to a predetermined second target air-fuel ratio.

The abnormality determination means may determine that abnormal air-fuel ratio variation among the cylinders has occurred when the detection value of the second exhaust gas air-fuel ratio is continuously leaner than the first target air-fuel ratio for a predetermined duration or longer during the air-fuel ratio control executed by the air-fuel ratio control means.

For example, when a malfunction has occurred in an injector of only part of the cylinders and the air-fuel ratio in the part of the cylinders is richer than the stoichiometric air-fuel ratio by a large amount, if the main air-fuel ratio control is executed, the total air-fuel ratio of the exhaust gas after the exhaust gas from all the cylinders are gathered is controlled to the first target air-fuel ratio. However, the air-fuel ratio in the part of the cylinders is richer than the first target air-fuel ratio by a large amount, and the air-fuel ratios in the other cylinders are leaner than the first target air-fuel ratio, although the total air-fuel ratio is a value around the first target air-fuel ratio. In addition, as a result of generation of a large amount of hydrogen in the part of the cylinders, an output from the first air-fuel ratio sensor erroneously indicates an air-fuel ratio that is richer than the actual air-fuel ratio as the first target air-fuel ratio.

When the exhaust gas that contains hydrogen passes through the catalyst element, the hydrogen is removed and no longer exerts an influence on the air-fuel ratio. Therefore, the output from the second air-fuel ratio sensor indicates the actual air-fuel ratio, that is, the air-fuel ratio that is leaner than the first target air-fuel ratio.

Therefore, according to the aspect of the invention described above, it is determined that abnormal air-fuel ratio variation has occurred among the cylinders, when the detection value of the second exhaust gas air-fuel ratio detected by the second air-fuel ratio sensor is continuously leaner than the first target air-fuel ratio for the predetermined duration or longer although the first exhaust gas air-fuel ratio is controlled to the first target air-fuel ratio by the main air-fuel ratio control. The air-fuel ratio differs between the upstream side and the downstream side of the catalyst because a considerably large amount of hydrogen is generated due to a malfunction of, for example, the injector of part of the cylinders.

The air-fuel ratio control means may calculate a control amount that is used in the sub-air-fuel ratio control based on an output from the second air-fuel ratio sensor, and the abnormality determination means may determine that abnormal air-fuel ratio variation among the cylinders has occurred, when the control amount is a value that is equal to or larger than a predetermined value based on which the second exhaust gas air-fuel ratio is corrected to a richer value during the air-fuel ratio control executed by the air-fuel ratio control means.

If abnormal air-fuel ratio variation among the cylinders has occurred due to, for example, a malfunction in the injector of part of the cylinders, the second air-fuel ratio sensor continuously detects a value indicating a lean air-fuel ratio. Therefore, the control amount that is used in the sub-air-fuel ratio control is a value based on which the air-fuel ratio is corrected to a richer value in order to offset the lean-deviation. Therefore, using this phenomenon, it is determined that abnormal air-fuel ratio variation among the cylinders has occurred when the control amount is a value equal to or lager than the predetermined value based on which the second exhaust gas air-fuel ratio is corrected to a richer value.

The air-fuel ratio control means may forcibly set the first target air-fuel ratio that is used in the main air-fuel ratio control to a value that is richer than a reference value, and the abnormality determination means may determine that abnormal air-fuel ratio variation among the cylinders has occurred when the detection value of the second exhaust gas air-fuel ratio is continuously leaner than the second target air-fuel ratio during the air-fuel ratio control executed by the air-fuel ratio control means.

When abnormal air-fuel ratio variation among the cylinders has occurred, the second exhaust gas air-fuel ratio is lean although the first exhaust gas air-fuel ratio is controlled to the first target air-fuel ratio, due to the influence of hydrogen. Therefore, even if the first exhaust gas air-fuel ratio is forcibly controlled to a value richer than the first target air-fuel ratio, the second exhaust gas air-fuel ratio is lean. Accordingly, whether abnormal air-fuel ratio variation has occurred is determined using this phenomenon.

The catalyst element may be arranged in a sensor element of the second air-fuel ratio sensor, and the abnormality determination means may determine that abnormal air-fuel ratio variation among the cylinders has occurred when the detection value of the second exhaust gas air-fuel ratio is leaner than the detection value of the first exhaust gas air-fuel ratio by an amount that is equal to or larger than a predetermined value.

In this case, the second air-fuel ratio sensor detects the second exhaust gas air-fuel ratio, that is, the air-fuel ratio of the exhaust gas from which hydrogen has been removed by the catalyst element that is arranged in the sensor element. Therefore, when abnormal air-fuel ratio variation among the cylinders has occurred, the output from the second air-fuel ratio sensor is leaner than the output from the first air-fuel ratio sensor by a large amount. Therefore, monitoring the difference between the outputs from these sensors makes it possible to determine whether abnormal air-fuel ratio variation among the cylinders has occurred.

Each of the first target air-fuel ratio and the second target air-fuel ratio may be set to a stoichiometric air-fuel ratio.

The air-fuel ratio control means may update a control amount that is used in the sub-air-fuel ratio control at a predetermined update rate based on an output from the second air-fuel ratio sensor, and the abnormality determination means may determine that abnormal air-fuel ratio variation among the cylinders has occurred when the control amount reaches a predetermined abnormality determination value based on which the second exhaust gas air-fuel ratio is corrected to a richer value. When the air-fuel ratio control means executes the sub-air-fuel ratio control using the control amount that is within a predetermined guard range and the abnormality determination means determines whether abnormal air-fuel ratio variation among the cylinders has occurred, the air-fuel ratio control means may execute at least one of control for increasing the guard range so that the guard range includes the abnormality determination value and control for increasing the update rate for the control amount.

When the guard range for the control amount is set, in some cases, the control amount is not able to reach the abnormality determination value because the upper limit value of the guard range is lower than the abnormality determination value which is compared with the control amount. In addition, because the control amount is gradually updated, it takes a long time for the control amount to actually reach the abnormality determination value. Therefore, to solve these problems, at least one of the control for increasing the guard range so that the guard range includes the abnormality determination value and the control for increasing the update rate for the control amount is executed. Thus, it is possible to accurately determine whether abnormal air-fuel ratio variation among the cylinders has occurred.

The apparatus may further include preliminary determination means for preliminarily determining whether there is a possibility that abnormal air-fuel ratio variation among the cylinders has occurred before the abnormality determination means confirms whether abnormal air-fuel ratio variation among the cylinders has occurred. The abnormality determination means may confirm whether abnormal air-fuel ratio variation among the cylinders has occurred after the preliminary determination means determines that there is a possibility that air-fuel ratio variation among the cylinders has occurred.

The preliminary determination means may determine that there is a possibility that abnormal air-fuel ratio variation among the cylinders has occurred, when at least one of a) a condition that an integrated value, which is obtained by integrating a difference between an output from the first air-fuel ratio sensor and a sensor output corresponding to the first target air-fuel ratio for a predetermined duration, exceeds a predetermined value, b) a condition that the second exhaust gas air-fuel ratio that is detected by the second air-fuel ratio sensor is continuously leaner than the first target air-fuel ratio for a predetermined duration or longer, and c) a condition that a ratio or a difference between an amount of oxygen stored in the catalyst element and an amount of oxygen released from the catalyst element is larger than a predetermined value is satisfied.

A second aspect of the invention relates to an apparatus for detecting abnormal air-fuel ratio variation among cylinders of a multi-cylinder internal combustion engine. The apparatus includes: a hydrogen concentration sensor that is arranged in an exhaust passage, and that detects a hydrogen concentration in exhaust gas; and abnormality determination means for determining whether abnormal air-fuel ratio variation among the cylinders has occurred based on an output from the hydrogen concentration sensor.

When abnormal air-fuel ratio variation among the cylinders has occurred, the hydrogen concentration in the exhaust gas increases. Using this phenomenon, it is possible to determine whether abnormal air-fuel ratio variation among the cylinders has occurred.

A third aspect of the invention relates to a method for detecting abnormal air-fuel ratio variation among cylinders of a multi-cylinder internal combustion engine in which a catalyst element, which oxidizes at least hydrogen contained in exhaust gas to remove the hydrogen, is provided in an exhaust passage. The method includes: detecting a first exhaust gas air-fuel ratio which is an air-fuel ratio of exhaust gas that has not passed through the catalyst element; detecting a second exhaust gas air-fuel ratio which is an air-fuel ratio of exhaust gas that has passed through the catalyst element; and determining whether abnormal air-fuel ratio variation among the cylinders has occurred based on an amount by which a detection value of the second exhaust gas air-fuel ratio is leaner than a detection value of the first exhaust gas air-fuel ratio.

In the third aspect of the invention, a first air-fuel ratio sensor that detects the first exhaust gas air-fuel ratio may be arranged in the exhaust passage at a position upstream of the catalyst element; and a second air-fuel ratio sensor that detects the second exhaust gas air-fuel ratio may be arranged in the exhaust passage at a position downstream of the catalyst element. The method may further include executing air-fuel ratio control that includes main air-fuel ratio control for bringing the detection value of the first exhaust gas air-fuel ratio to a predetermined first target air-fuel ratio and sub-air-fuel ratio control for bringing the detection value of the second exhaust gas air-fuel ratio to a predetermined second target air-fuel ratio.

It may be determined that abnormal air-fuel ratio variation among the cylinders has occurred when the detection value of the second exhaust gas air-fuel ratio is continuously leaner than the first target air-fuel ratio for a predetermined duration or longer during the air-fuel ratio control.

The air-fuel ratio control may include calculating a control amount that is used in the sub-air-fuel ratio control. It may be determined that abnormal air-fuel ratio variation among the cylinders has occurred when the control amount is a value that is equal to or larger than a predetermined value based on which the second exhaust gas air-fuel ratio is corrected to a richer value during the air-fuel ratio control.

The air-fuel ratio control may include forcibly setting the first target air-fuel ratio that is used in the main air-fuel ratio control to a value that is richer than a reference value. It may be determined that abnormal air-fuel ratio variation among the cylinders has occurred when the detection value of the second exhaust gas air-fuel ratio is continuously leaner than the second target air-fuel ratio during the air-fuel ratio control.

The first exhaust gas air-fuel ratio may be detected by a first air-fuel ratio sensor, the second exhaust gas air-fuel ratio may be detected by a second air-fuel ratio sensor, and the catalyst element may be arranged in a sensor element of the second air-fuel ratio sensor. It may be determined that abnormal air-fuel ratio variation among the cylinders has occurred when the detection value of the second exhaust gas air-fuel ratio is leaner than the detection value of the first exhaust gas air-fuel ratio by an amount that is equal to or larger than a predetermined value.

Each of the first target air-fuel ratio and the second target air-fuel ratio may be set to a stoichiometric air-fuel ratio.

A fourth aspect of the invention relates to a method for detecting abnormal air-fuel ratio variation among cylinders of a multi-cylinder internal combustion engine in which a hydrogen concentration sensor that detects a hydrogen concentration in exhaust gas is arranged in an exhaust passage. The method includes determining whether abnormal air-fuel ratio variation among the cylinders has occurred based on an output from the hydrogen concentration sensor.

According to the aspects of the invention described above, it is possible to provide a practical apparatus and method for accurately detecting abnormal air-fuel ratio variation among cylinders of a multi-cylinder internal combustion engine.

BRIEF DESCRIPTION OF THE DRAWINGS

The foregoing and further features and advantages of the invention will become apparent from the following description of example embodiments with reference to the accompanying drawings, wherein the same or corresponding portions will be denoted by the same reference numerals and wherein.

DETAILED DESCRIPTION OF EMBODIMENTS

Hereafter, example embodiments of the invention will be described with reference to the accompanying drawings.

Figure 1:
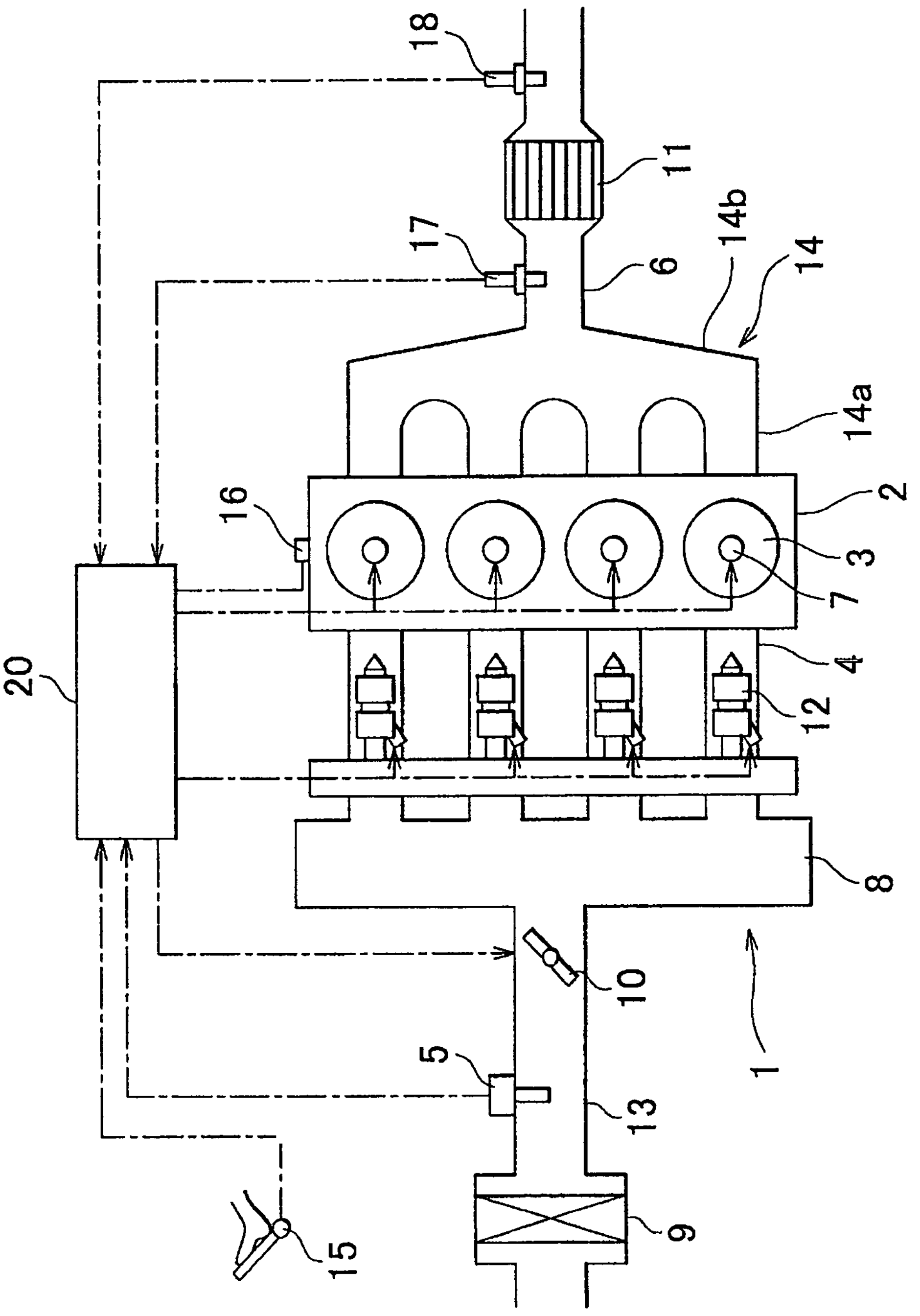
FIG. 1 is a view schematically showing an internal combustion engine according to an embodiment of the invention.

FIG. 1 is a view schematically showing an internal combustion engine according to an embodiment of the invention. As shown in FIG. 1, an internal combustion engine 1 burns air-fuel mixture in combustion chambers 3, which are within a cylinder block 2, to reciprocate pistons in cylinders, thereby producing power. The internal combustion engine 1 according to the embodiment is a multi-cylinder internal combustion engine for an automobile, more specifically, an in-line four cylinder spark ignition internal combustion engine, that is, a gasoline engine. However, an internal combustion engine to which the invention is applicable is not limited to the internal combustion engine described above. The invention is applicable to any type of multi-cylinder internal combustion engine regardless of the number of cylinders, ignition method, etc.

Although not shown in FIG. 1, each cylinder is provided with an intake valve that opens or closes an intake port and an exhaust valve that opens or closes an exhaust port. The intake valve and the exhaust valve are arranged in a cylinder head of the internal combustion engine 1. The intake valves and the exhaust valves are opened or closed by camshafts. Spark plugs 7, which are used to ignite the air-fuel mixture in the combustion chambers 3, are fitted to the top portions of the cylinder head. Each cylinder is provided with the spark plug 7.

The intake ports of the respective cylinders are connected to a surge tank 8, which is an intake air gathering chamber, through branch pipes 4 that are communicated with the respective cylinders. An intake pipe 13 is connected to an upstream-side portion of the surge tank 8, and an air cleaner 9 is provided at an upstream-side end portion of the intake pipe 13. An airflow meter 5 that detects the intake air amount is fitted to the intake pipe 13. An electronically-controlled throttle valve 10 is arranged in the intake pipe 13 at a position downstream of the airflow meter 5. The intake ports, the branch pipes, the surge tank 8, and the intake pipe 13 constitute an intake passage.

The cylinders are provided with injectors 12 that inject fuel into the intake passage, more specifically, into the intake ports. The fuel injected from the injector 12 is mixed with the intake air to form the air-fuel mixture. The air-fuel mixture is taken into the combustion chamber 3 when the intake valve is open, compressed by the piston, ignited by the ignition plug 7, and then burned.

The exhaust ports of the respective cylinders are connected to an exhaust manifold 14. The exhaust manifold 14 is formed of branch pipes 14*a*, which are upstream-side portions of the exhaust manifold 14 and which are connected to the respective cylinders, and an exhaust gas gathering portion 14*b*, which is a downstream-side portion of the exhaust manifold 14. An exhaust pipe 6 is connected to a downstream-side portion of the exhaust gas gathering portion 14*b*. The exhaust ports, the exhaust manifold 14 and the exhaust pipe 6 constitute an exhaust passage. A catalyst 11 that is formed of a three-way catalyst is fitted to the exhaust pipe 6. The catalyst 11 functions as a catalyst element according to the invention. A first air-fuel ratio sensor, that is, a catalyst upstream-side sensor 17, is arranged upstream of the catalyst 11. A second air-fuel ratio sensor, that is, a catalyst downstream-side sensor 18, is arranged downstream of the catalyst 11. The catalyst upstream-side sensor 17 is arranged in the exhaust passage at a position immediately upstream of the catalyst 11, and the catalyst downstream-side sensor 18 is arranged in the exhaust passage at a position immediately downstream of the catalyst 11. The catalyst upstream-side sensor 17 and the catalyst-downstream side sensor 18 detect the air-fuel ratio based on the oxygen concentration in the exhaust gas. As described above, the single catalyst upstream-side sensor 17 is arranged in the exhaust passage at the exhaust gas gathering portion.

The above-described spark plugs 7, the throttle valve 10, the injectors 12, etc. are electrically connected to an electronic control unit (hereinafter, referred to as "ECU") 20 that functions as control means. The ECU 20 includes a CPU, a ROM, a RAM, an input port, an output port, a storage unit, etc. (all of which are not shown). As shown in FIG. 1, in addition to the airflow meter 5, the catalyst upstream-side sensor 17, and the catalyst downstream-side sensor 18, a crank angle sensor 16 that detects a crank angle of the internal combustion engine 1, an accelerator pedal operation amount sensor 15 that detects an accelerator pedal operation amount, and various other sensors are connected to the ECU 20 via, for example, an A/D converter (not shown). The ECU 20 controls the spark plugs 7, the throttle valve 10, the injectors 12, etc. to control the ignition timing, the fuel injection amount, the fuel injection timing, the throttle valve opening amount, etc. The throttle valve opening amount is usually controlled to an opening amount that corresponds to the accelerator pedal operation amount.

The catalyst 11 removes NOx, HC and CO, which are toxic substances in the exhaust gas, at the same time, when an air-fuel ratio A/F in the exhaust gas that flows into the catalyst 11 is at or around the stoichiometric air-fuel ratio (e.g. A/F=14.6). The air-fuel ratio range, in which NOx, HC and CO are removed at the same time with high efficiency, is relatively narrow. In addition, the catalyst 11 oxidizes (burns) hydrogen $H_2$ that is mixed into the exhaust gas to remove it.

Figure 2:
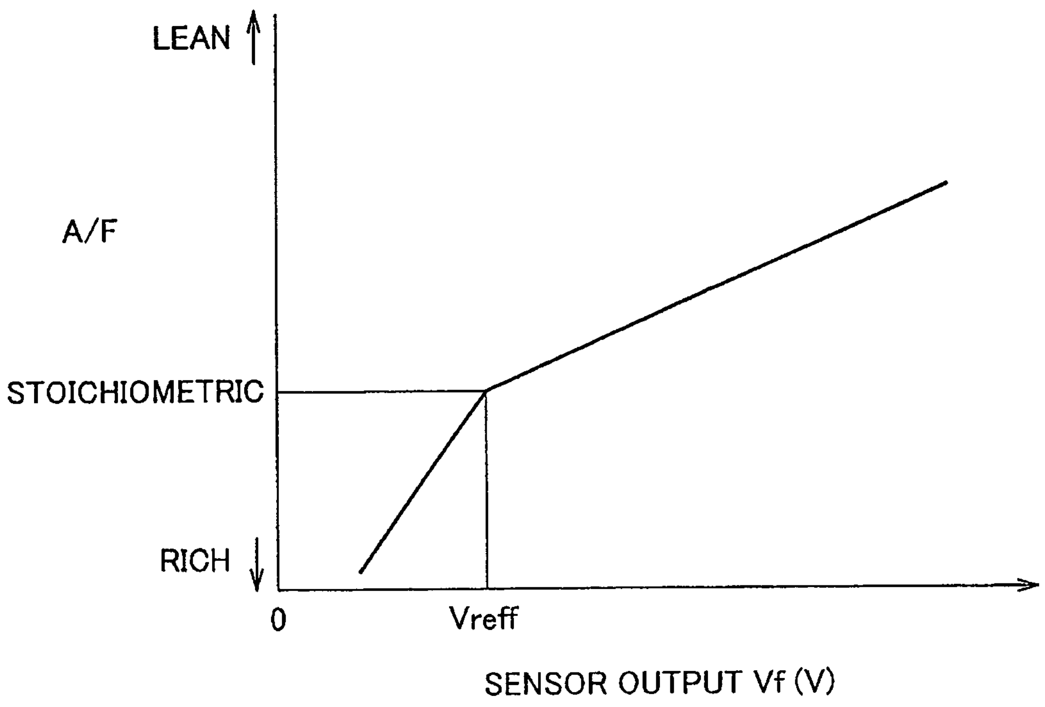
FIG. 2 is a graph indicating output characteristics of a catalyst upstream-side sensor.

The catalyst upstream-side sensor 17 is formed of a so-called wide-range air-fuel ratio sensor, and is able to continuously detect a relatively wide range of air-fuel ratio. FIG. 2 shows output characteristics of the catalyst upstream-side sensor 17. As shown in FIG. 2, the catalyst upstream-side sensor 17 outputs a voltage signal Vf having a magnitude that is proportional to the detected air-fuel ratio of the exhaust gas. An output voltage when the air-fuel ratio of the exhaust gas matches the stoichiometric air-fuel ratio is denoted by Vreff (e.g. approximately 3.3 V). The slope of the line indicating the relationship between the air-fuel ratio and the output voltage changes when the air-fuel ratio reaches the stoichiometric air-fuel ratio.

Figure 3:
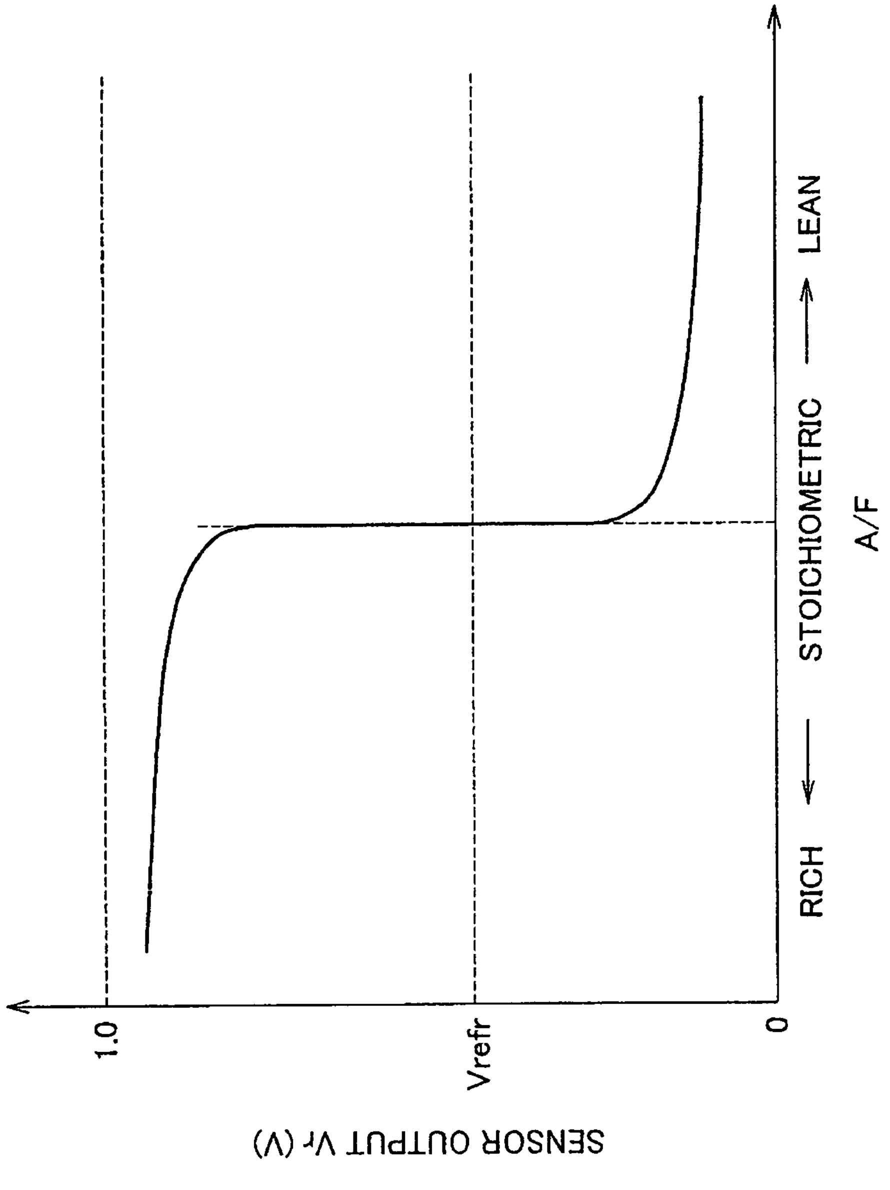
FIG. 3 is a graph indicating output characteristics of a catalyst downstream-side sensor.

The catalyst downstream-side sensor 18 is formed of a so-called $O_2$ sensor. The output value from the catalyst downstream-side sensor 18 sharply changes when the air-fuel ratio reaches the stoichiometric air-fuel ratio. FIG. 3 shows the output characteristics of the catalyst downstream-side sensor 18. As shown in FIG. 3, an output voltage Vr from the catalyst downstream-side sensor 18 transitionally changes when the air-fuel ratio is around the stoichiometric air-fuel ratio. When the detected air-fuel ratio of the exhaust gas is leaner than the stoichiometric air-fuel ratio, the output voltage Vr exhibits a small value, for example, approximately 0.1 V. When the detected air-fuel ratio of the exhaust gas is richer than the stoichiometric air-fuel ratio, the output voltage Vr exhibits a large value, for example, approximately 0.9 V. A voltage Vrefr of 0.45 V, which is approximately the intermediate value between 0.1 V and 0.9 V, is regarded as a value corresponding to the stoichiometric air-fuel ratio. When the output voltage from the catalyst downstream-side sensor 18 is larger than Vrefr, the air-fuel ratio of the exhaust gas is richer than the stoichiometric air-fuel ratio. When the output voltage from the catalyst downstream-side sensor 18 is smaller than Vrefr, the air-fuel ratio of the exhaust gas is leaner than the stoichiometric air-fuel ratio. The air-fuel ratio of the exhaust gas is detected in this way.

When hydrogen is contained in the exhaust gas that is discharged from the combustion chamber 3, the air-fuel ratio of the exhaust gas, which has not passed through the catalyst 11 and which contains hydrogen, that is, a first exhaust gas air-fuel ratio, is detected by the catalyst upstream-side sensor 17, that is, a first air-fuel ratio sensor. When the exhaust gas that contains hydrogen passes through the catalyst 11, the hydrogen in the exhaust gas is removed by the catalyst 11. The air-fuel ratio of the exhaust gas, which has passed through the catalyst 11 and from which hydrogen has been removed, that is, a second exhaust gas air-fuel ratio, is detected by the catalyst downstream-side sensor 18, that is, a second air-fuel ratio sensor.

A sensor element of the catalyst downstream-side sensor 18 is provided with a catalyst. Hydrogen in the exhaust gas is removed also by this catalyst, that is, the sensor catalyst. Therefore, the sensor catalyst constitutes part of a catalyst element according to the invention. If there is hydrogen that has not been removed by the catalyst 11, this hydrogen is removed by the sensor catalyst. The air-fuel ratio of the exhaust gas from which hydrogen has been removed is detected by the catalyst downstream-side sensor 18. Note that, the catalyst downstream-side sensor 18 need not be provided with a catalyst. The catalyst upstream-side sensor 17 is not provided with a sensor catalyst.

According to the embodiment, the ECU 20 executes air-fuel ratio control described below so that the air-fuel ratio of the exhaust gas that flows into the catalyst 11 is controlled to a value at or around the stoichiometric air-fuel ratio. The air-fuel ratio control includes main air-fuel ratio control and sub-air-fuel ratio control. The main air-fuel ratio control is executed to bring the air-fuel ratio of the exhaust gas that is detected by the catalyst upstream-side sensor 17 to a predetermined first target air-fuel ratio. The sub-air-fuel ratio control is executed to bring the air-fuel ratio of the exhaust gas that is detected by the catalyst downstream-side sensor 18 to a predetermined second target air-fuel ratio. Each of the first target air-fuel ratio and the second target air-fuel ratio is set to the stoichiometric air-fuel ratio.

Figure 4:
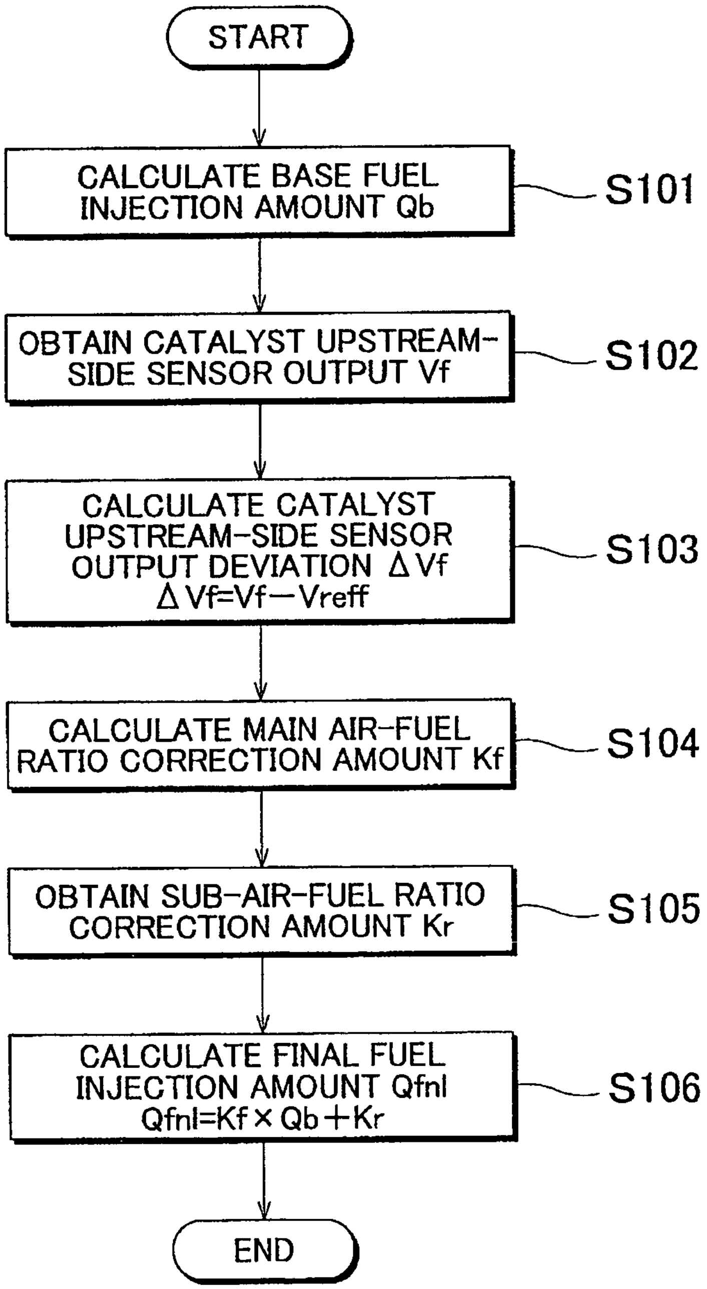
FIG. 4 is a flowchart showing an air-fuel ratio control routine.

FIG. 4 shows an air-fuel ratio control routine. The routine is periodically executed by the ECU 20 at every one engine cycle (=every time a crank shaft rotates 720 degrees).

In step (hereinafter, referred to as "S") 101, the ECU 20 calculates a base fuel injection amount with which the air-fuel ratio of the air-fuel mixture in the combustion chamber is brought to the stoichiometric air-fuel ratio, that is, a base fuel injection amount Qb. The base fuel injection amount Qb is calculated based on an intake air amount Ga that is detected by the airflow meter according to the following equation, Qb=Ga/14.6.

In S102, the ECU 20 receives a signal indicating the output Vf from the catalyst upstream-side sensor 17 (hereinafter, referred to as "sensor output Vf" where appropriate). In S103, the ECU 20 calculates the deviation of the sensor output Vf from a sensor output Vreff corresponding to the stoichiometric air-fuel ratio (hereinafter, referred to as "stoichiometric-corresponding sensor output Vreff") (see FIG. 2), that is, a catalyst upstream-side sensor output deviation ΔVf (ΔVf=Vf−Vreff).

Figure 5:
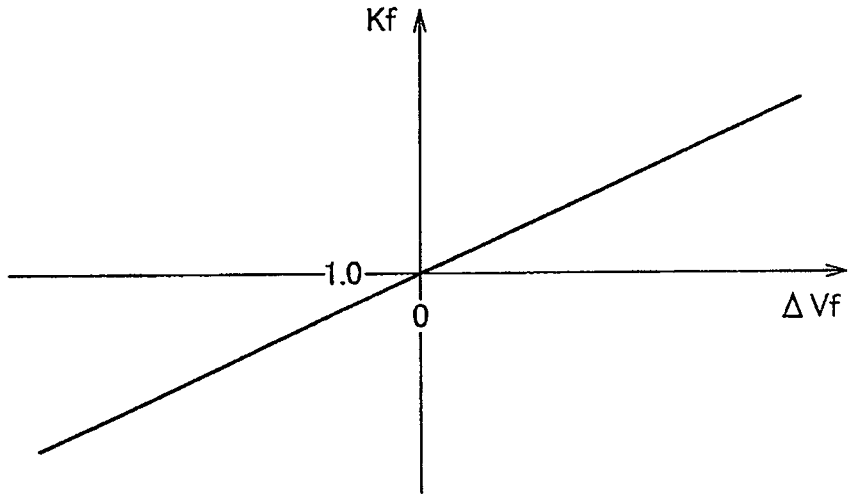
FIG. 5 is a map for calculating a main air-fuel ratio correction amount.

In S104, the ECU 20 calculates a main air-fuel ratio correction amount (correction coefficient) Kf based on the catalyst upstream-side sensor output deviation ΔVf according to a map shown in FIG. 5 (a function may be used instead of the map). The catalyst upstream-side sensor output deviation ΔVf and the main air-fuel ratio correction amount Kf are control amounts used in the main air-fuel ratio control. For example, if a gain is Pf, the main air-fuel ratio correction amount Kf is expressed by the following equation, Kf=Pf×ΔVf. In S105, the ECU 20 receives a value of a sub-air-fuel ratio correction amount Kr that is set in another routine shown in FIG. 6. Finally, in S106, the ECU 20 calculates a final fuel injection amount that should be injected from the injector 12, that is, a final fuel injection amount Qfnl according to the following equation, Qfnl=Kf×Qb+Kr.

According to the map in FIG. 5, as the catalyst upstream-side sensor output Vf is larger than the stoichiometric-corresponding sensor output Vreff by a larger amount (ΔVf>0), that is, as the actual catalyst upstream-side air-fuel ratio is leaner than the stoichiometric air-fuel ratio by a larger amount, the correction amount Kf that is larger than 1 by a larger amount is obtained, and the base fuel injection amount Qb is increased by a larger amount. On the other hand, as the catalyst upstream-side sensor output Vf is smaller than the stoichiometric-corresponding sensor output Vreff by a larger amount (ΔVf<0), that is, as the actual catalyst upstream-side air-fuel ratio is richer than the stoichiometric air-fuel ratio by a larger amount, the correction amount Kf that is smaller than 1 by a larger amount is obtained, and the base fuel injection amount Qb is decreased by a larger amount. In this way, the main air-fuel ratio feedback control is executed to bring the catalyst upstream-side air-fuel ratio that is detected by the catalyst upstream-side sensor 17 to the stoichiometric air-fuel ratio.

The value of the final fuel injection amount Qfnl that is calculated in S106 is uniformly applied to all the cylinders. That is, during one engine cycle, an amount of fuel equal to the final fuel injection amount Qfnl is injected from the injector 12 in each cylinder. In the next engine cycle, an amount of fuel equal to the newly-calculated final fuel injection amount Qfnl is injected from the injector 12 in each cylinder.

As is commonly known, when the final fuel injection amount Qfnl is calculated, another correction, for example, coolant temperature correction, or battery voltage correction may be additionally made.

Figure 6:
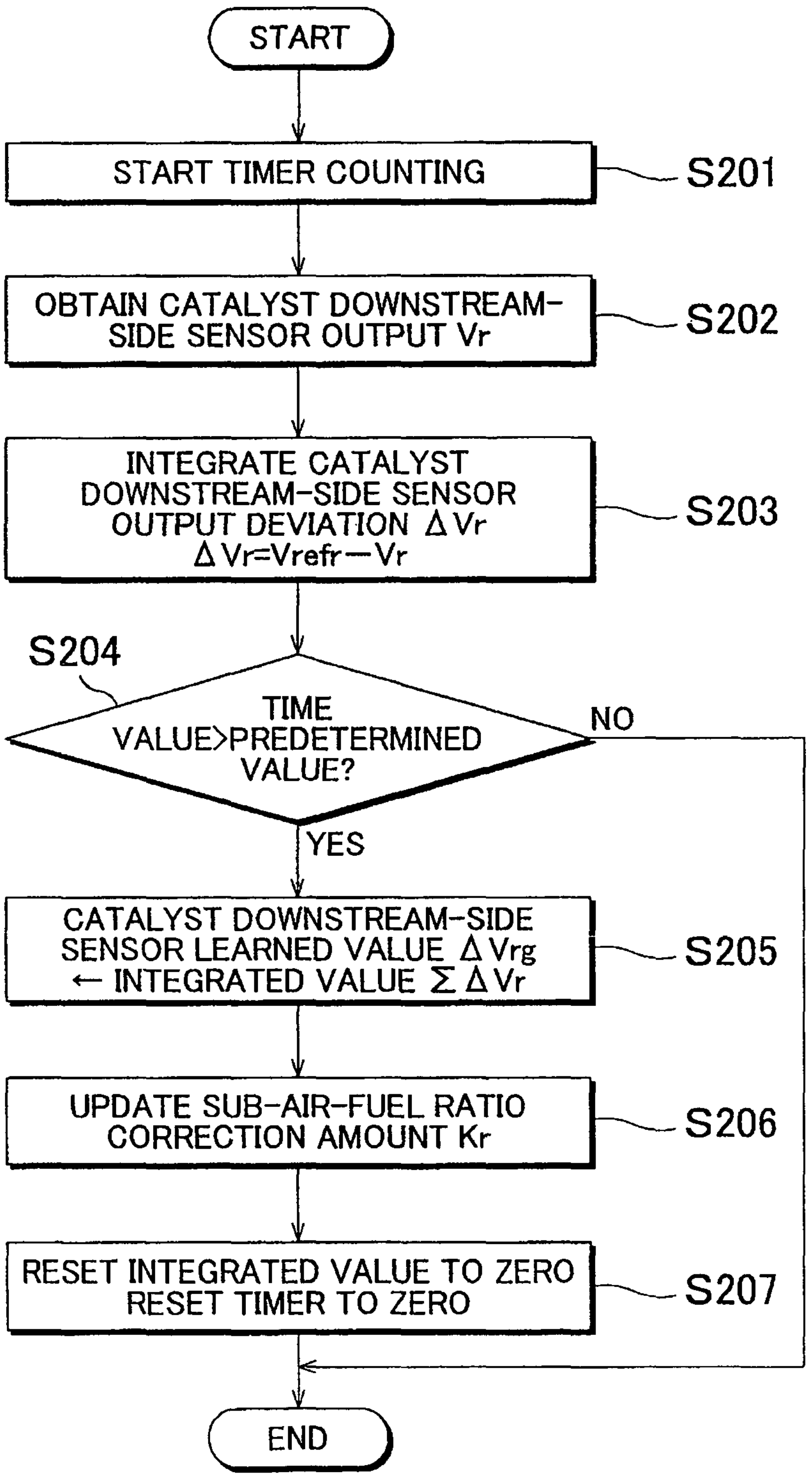
FIG. 6 is a flowchart showing a routine for setting a sub-air-fuel ratio correction amount.

FIG. 6 shows a routine for setting a sub-air-fuel ratio correction amount. The routine is periodically executed by the ECU 20 in predetermined calculation cycles.

Figure 7:
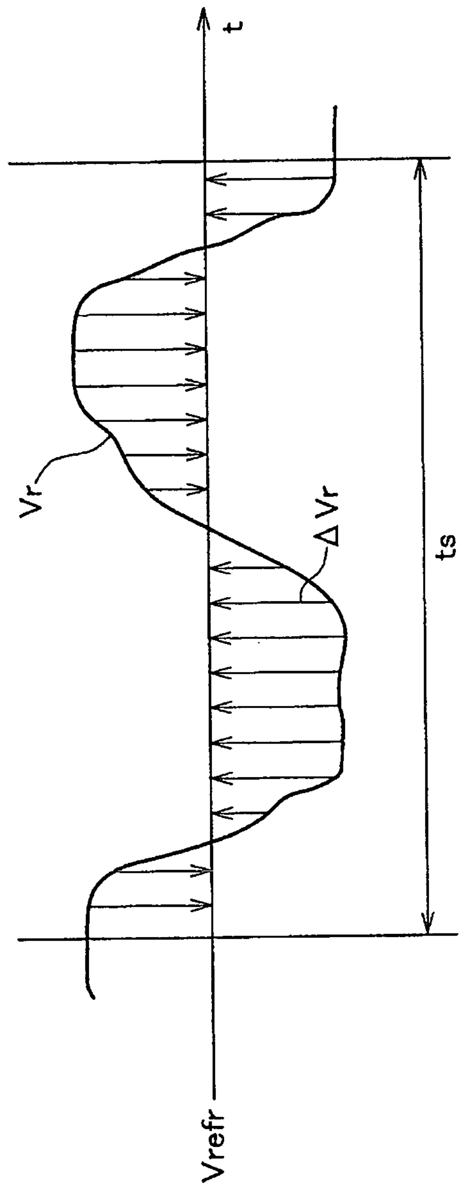
FIG. 7 is a graph showing a deviation of an output from the catalyst downstream-side sensor from a sensor output corresponding to the stoichiometric air fuel ratio, and integration of the deviation.

In S201, a tinier provided in the ECU 20 starts counting elapsed time. In S202, the ECU 20 receives a signal indicating the output Vr from the catalyst downstream-side sensor 18. In S203, the ECU 20 calculates the deviation of the sensor output Vr from the stoichiometric-corresponding sensor output Vrefr (see FIG. 3), that is, the catalyst downstream-side sensor output deviation ΔVr=Vrefr−Vr, and the catalyst downstream-side sensor output deviation ΔVr is added to the immediately preceding integrated value. FIG. 7 shows the catalyst downstream-side sensor output deviation ΔVr, and integration of the catalyst downstream-side sensor output deviation ΔVr.

In S204, it is determined whether a value indicated by the timer (hereinafter, referred to as "timer value") has exceeded a predetermined duration ts. If it is determined that the timer value has not exceeded the predetermined duration ts, the routine ends.

On the other hand, if it is determined that the timer value has exceeded the predetermined duration ts, in S205, an integrated value ΣΔVr of the catalyst downstream-side sensor output deviation ΔVr (hereinafter, referred to as "catalyst downstream-side sensor output deviation integrated value ΣΔVr") is updated and then stored as a catalyst downstream-side sensor learned value ΔVrg. In S206, the sub-air-fuel ratio correction amount Kr is calculated based on the catalyst downstream-side sensor learned value ΔVrg according to a map shown in FIG. 8, and this sub-air-fuel ratio correction amount Kr is stored. The catalyst downstream-side sensor learned value ΔVrg and the sub-air-fuel ratio correction amount Kr are control amounts used in the sub-air-fuel ratio control. For example, if a gain is Pr, the sub-air-fuel ratio correction amount Kr is expressed by the following equation, Kr=Pr×ΔVrg. Finally, in S207, the catalyst downstream-side sensor output deviation integrated value ΣΔVr is reset to 0, and the timer is also reset to 0.

The catalyst downstream-side sensor output deviation ΔVr is integrated during the predetermined duration ts in order to detect the time-average deviation of the catalyst downstream-side sensor output Vr from the stoichiometric-corresponding sensor output Vrefr. The predetermined duration ts that restricts the duration, during which the catalyst downstream-side sensor output deviation ΔVr is integrated, is considerably longer than one engine cycle. Therefore, the catalyst downstream-side sensor learned value ΔVrg and the sub-air-fuel ratio correction amount Kr are updated in predetermined cycles each of which is considerably longer than one engine cycle.

Figure 8:
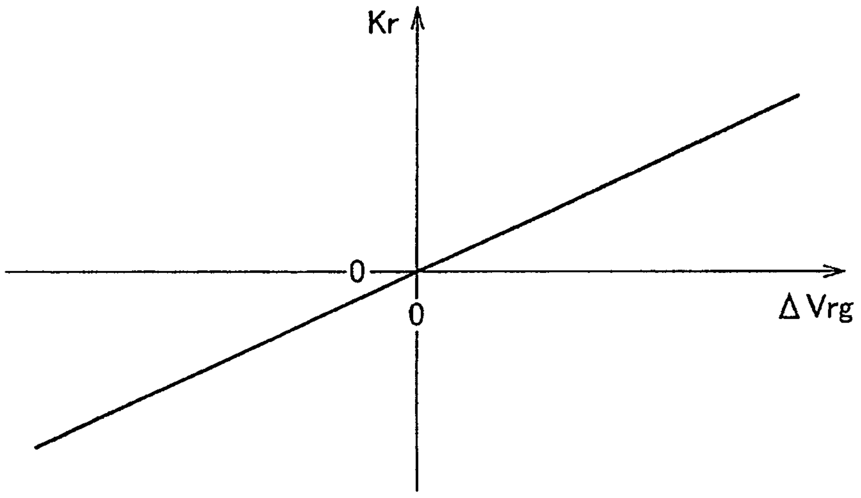
FIG. 8 is a map for calculating a sub-air-fuel ratio correction amount.

As shown in FIG. 8, as the time average of the catalyst downstream-side sensor output Vr is smaller than the stoichiometric-corresponding sensor output Vrefr by a larger amount (ΔVrg>0), that is, as the actual catalyst downstream-side air-fuel ratio is leaner than the stoichiometric air-fuel ratio by a larger amount, the correction amount Kr that is larger than 0 by a larger amount is obtained, and the base fuel injection amount Qb is increased by a larger amount when the final fuel injection amount is calculated. On the other hand, as the time average of the catalyst downstream-side sensor output Vr is larger than the stoichiometric-corresponding sensor output Vrefr by a larger amount (ΔVrg<0), that is, as the actual catalyst downstream-side air-fuel ratio is richer than the stoichiometric air-fuel ratio by a larger amount, the correction amount Kr that is smaller than 0 by a larger amount is obtained, and the base fuel injection amount Qb is decreased by a larger amount. In this way, the sub-air-fuel ratio feedback control is executed to bring the catalyst downstream-side air-fuel ratio that is detected by the catalyst downstream-side sensor 18 to the stoichiometric air-fuel ratio. Even if the main air-fuel ratio feedback control is executed, the air-fuel ratio may deviate from the stoichiometric air-fuel ratio due to, for example, deterioration of the catalyst upstream-side sensor 17. In order to offset the deviation, the sub-air-fuel ratio feedback control is executed.

In the embodiment, every time the learned value ΔVrg and the correction amount Kr are newly calculated, the learned value ΔVrg and the correction amount Kr are updated to the newly calculated values. However, the update rate may be reduced by executing an averaging process, for example, a smoothing process.

Next, determination as to whether abnormal air-fuel ratio variation among the cylinders has occurred according to the embodiment will be described.

As described in JP-A-04-318250, if a malfunction that exerts an influence on all the cylinders has occurred in a fuel supply system such as the injector or an air system such as the airflow meter, the absolute value of the feedback correction amount used in the main air-fuel ratio control increases. Therefore, it is possible to determine whether such a malfunction has occurred by monitoring the absolute value of the feedback correction amount using the ECU. For example, if the fuel injection amount deviates from the amount corresponding to the stoichiometric air-fuel ratio (hereinafter, referred to as "stoichiometric-corresponding amount") by 5% in total (that is, if the fuel injection amount deviates from the stoichiometric-corresponding amount by 5% in each of all the cylinders), the feedback correction amount used in the main air-fuel ratio control is a value that offsets the deviation of 5%, that is, the feedback correction amount is a value corresponding to −5%. Thus, it is determined that a malfunction that causes 5% deviation of the fuel injection amount from the stoichiometric-corresponding amount has occurred in the fuel supply system or the air system. When the feedback correction amount is equal to or larger than a relatively large predetermined value, it is determined that a malfunction that exerts an influence on all the cylinders has occurred in the fuel supply system or the air system. In the embodiment, there is provided abnormality determination means, that is, abnormality determination means for determining whether a malfunction has occurred based on the main air-fuel ratio correction amount Kf or the catalyst upstream-side sensor output deviation ΔVf.

Figure 9:
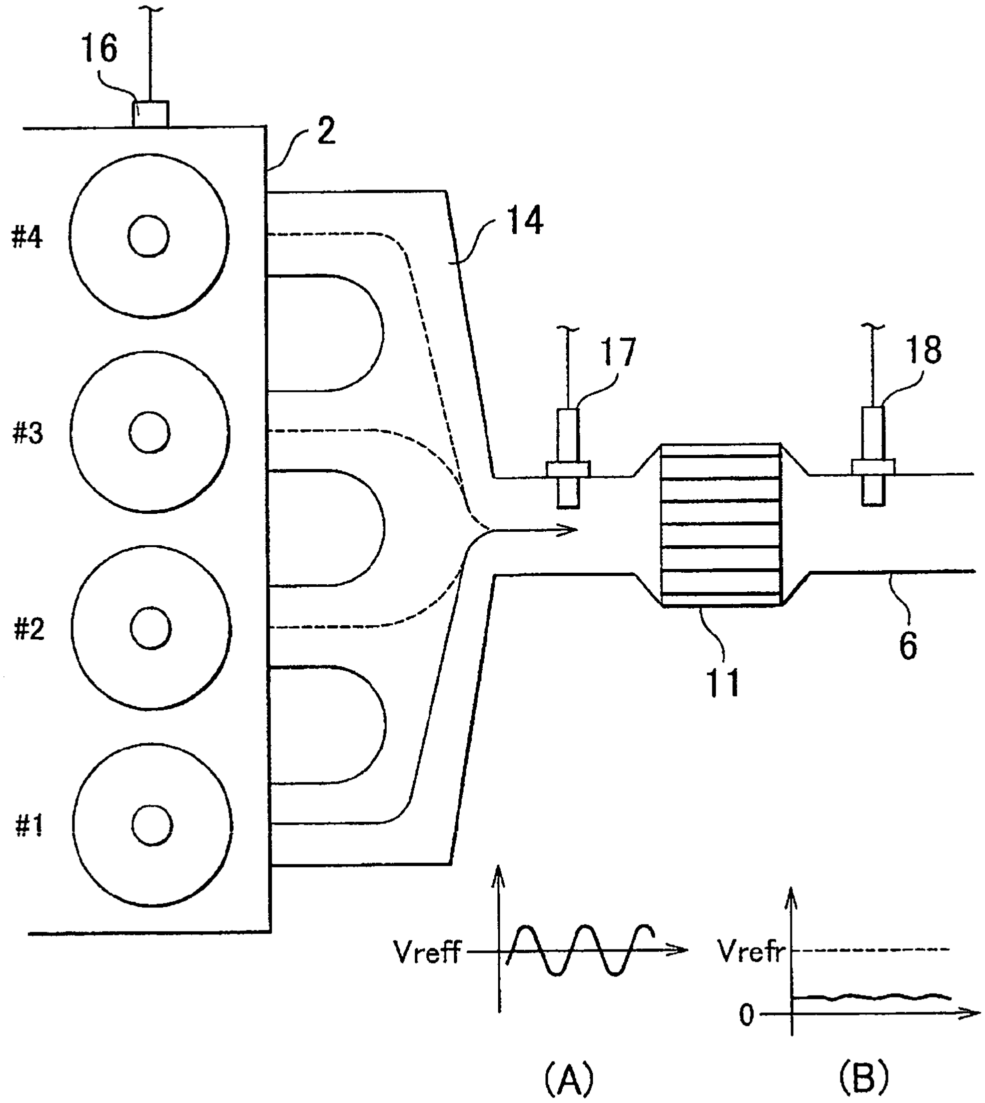
FIG. 9 is a view showing the state in which the air-fuel ratio in one cylinder is richer than the air-fuel ratio in the other cylinders, and illustrating determination as to whether abnormal air-fuel ratio variation among the cylinders has occurred according to a first embodiment of the invention.

Instead of the case in which a malfunction that exerts an influence on all the cylinders has occurred in the fuel supply system or the air system, the case in which air-fuel ratio variation (hereinafter, referred to as "imbalance" where appropriate) has occurred among the cylinders will be described below. FIG. 9 shows a case where the air-fuel ratio in only one cylinder (cylinder #1) is richer than the air-fuel ratio in the other three cylinders (#2 to #4). The following description will be provided on the assumption that a malfunction has occurred in the injector of the cylinder #1 and the amount of fuel injected into the cylinder #1 significantly deviates by 20% from the stoichiometric-corresponding amount, whereas the cylinders #2 to #4 are in the normal condition and the amount of fuel injected into each of the cylinders #2 to #4 matches the stoichiometric-corresponding amount. In this case, the deviation is 20% in total (20+0+0+0=20). The deviation in this case is supposed to be equal to the total deviation in the case where the amount of fuel injected into each cylinder deviates from the stoichiometric-corresponding amount by 5% (5+5+5+5=20).

However, the amount of hydrogen that is generated in the combustion chambers is larger when the air-fuel ratio in only one cylinder is considerably richer than the stoichiometric air-fuel ratio than when the air-fuel ratios in all the cylinders are slightly and equally richer than the stoichiometric air-fuel ratio. The oxygen concentration in the exhaust gas decreases by an amount corresponding to the difference in the amount of hydrogen generated in the combustion chambers between when the air-fuel ratio in only one cylinder is considerably richer than the stoichiometric air-fuel ratio and when the air-fuel ratios in all the cylinders are slightly and equally richer than the stoichiometric air-fuel ratio. Therefore, the output Vf from the catalyst upstream-side sensor 17 exhibits a value on the richer side than the stoichiometric-corresponding sensor output Vreff by a larger amount when the air-fuel ratio in only one cylinder is considerably richer than the stoichiometric air-fuel ratio than when the air-fuel ratios in all the cylinders are slightly and equally richer than the stoichiometric air-fuel ratio.

Figure 10:
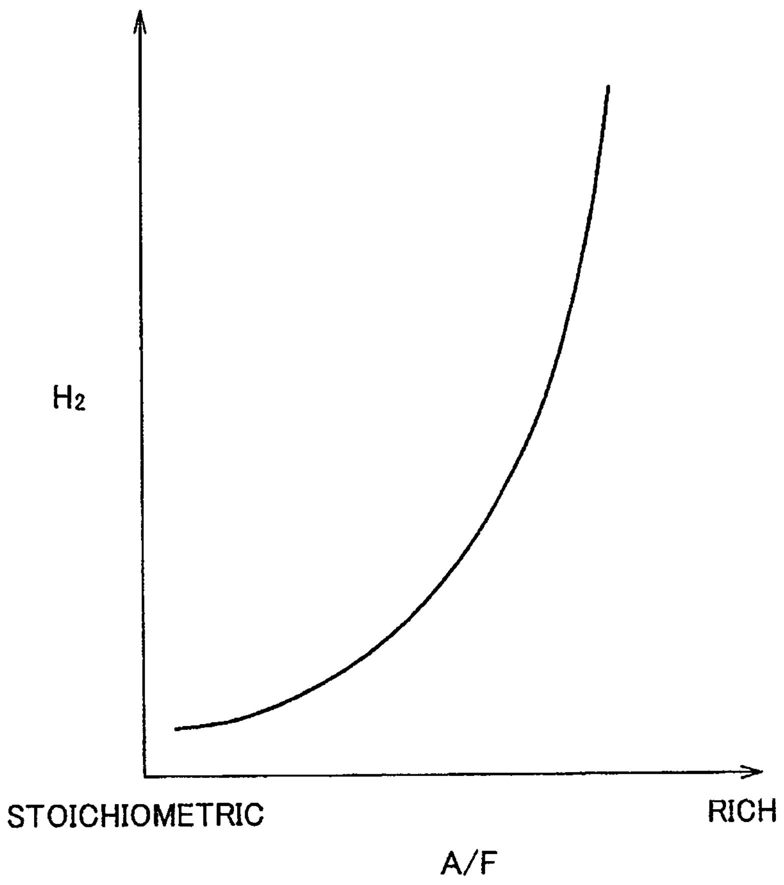
FIG. 10 is a graph showing the relationship between deviation of the air-fuel ratio in one cylinder from the stoichiometric air-fuel ratio and the amount of hydrogen that is discharged from a combustion chamber.

FIG. 10 shows the relationship between the amount by which the air-fuel ratio of the air-fuel mixture in one cylinder is richer than the stoichiometric air-fuel ratio (indicated by the abscissa axis), and the amount of hydrogen generated in the combustion chambers (indicated by the ordinate axis). As shown in FIG. 10, the amount of hydrogen generated in the combustion chambers increases in a quadratic functional manner with respect to an increase in the amount by which the air-fuel ratio in the one cylinder is richer than the stoichiometric air-fuel ratio. Therefore, the amount of hydrogen that is generated in the combustion chambers is larger and the catalyst upstream-side sensor output Vf exhibits a value on the richer side than the stoichiometric-corresponding sensor output Vreff by a larger amount, when the air-fuel ratio in only one cylinder is richer than the stoichiometric air-fuel ratio by 20% than when the air-fuel ratios in all the cylinders are equally richer than the stoichiometric air-fuel ratio by 5%.

Even the deviation is the same in total, the exhaust emission more deteriorates when air-fuel ratio varies among the cylinders than when the air-fuel ratios in the respective cylinders equally deviate from the stoichiometric air-fuel ratio. For example, if the air-fuel ratios in all the cylinders deviate equally by 5% from the stoichiometric air-fuel ratio, the deviation of 5% in each cylinder is offset by making a correction of −5% in the sub-air-fuel ratio feedback control. However, if the air-fuel ratio in only one cylinder deviates by 20% from the stoichiometric air-fuel ratio, even if a correction of −5% is made in the sub-air-fuel ratio control, the deviation of the air-fuel ratio in the cylinder #1 from the stoichiometric air-fuel ratio is 15%, the deviation of the air-fuel ratio in the cylinder #2 from the stoichiometric air-fuel ratio is −5%, the deviation of the air-fuel ratio in the cylinder #3 from the stoichiometric air-fuel ratio is −5%, and the deviation of the air-fuel ratio in the cylinder #4 from the stoichiometric air-fuel ratio is −5%. Therefore, it seems that the deviation is offset in total (15+(−5)+(−5)+(−5)=0). However, the air-fuel ratio in each cylinder still deviates from the stoichiometric air-fuel ratio. Therefore, the exhaust emission deteriorates in each cylinder.

In the main air-fuel ratio feedback control, the catalyst upstream-side air-fuel ratio, which is used as the total air-fuel ratio, is detected, and the detected catalyst upstream-side air-fuel ratio is controlled to the stoichiometric air-fuel ratio. Therefore, it is not possible to determine whether air-fuel ratio variation among the cylinders has occurred based on the correction amount that is used in the main air-fuel ratio feedback control. That is, even if air-fuel ratio variation among the cylinders has occurred, when the total deviation is 0, the correction amount is also 0. Therefore, it seems as if the main air-fuel ratio feedback control were executed properly without any problem.

Therefore, according to the embodiment, it is determined whether abnormal air-fuel ratio variation among the cylinders has occurred in the following manner, using the fact that the amount of hydrogen generated in the combustion chambers is larger and the catalyst upstream-side sensor output Vf exhibits a value on the richer side than the stoichiometric-corresponding sensor output Vreff by a larger amount when air-fuel ratio variation among cylinders has occurred than when the air-fuel ratios in all the cylinders equally deviate from the stoichiometric air-fuel ratio.

When hydrogen is contained in the exhaust gas, the hydrogen in the exhaust gas is oxidized (burned) to be removed when the exhaust gas passes through the catalyst. The air-fuel ratio of the exhaust gas, which has not passed through the catalyst and from which hydrogen has not been removed, that is, the first exhaust gas air-fuel ratio is detected by the first air-fuel ratio sensor. In addition, the air-fuel ratio of the exhaust gas, which has passed through the catalyst and from which hydrogen has been removed, that is, the second exhaust gas air-fuel ratio is detected by the second air-fuel ratio sensor. The first exhaust gas air-fuel ratio detection value is richer than the second exhaust gas air-fuel ratio detection value due to the influence of hydrogen. Conversely, the second exhaust gas air-fuel ratio detection value is leaner than the first exhaust gas air-fuel ratio detection value due to the influence of hydrogen. Therefore, whether abnormal air-fuel ratio variation among the cylinders has occurred is determined based on the amount (deviation) by which the second exhaust gas air-fuel ratio detection value is leaner than the first exhaust gas air-fuel ratio detection value.

More specifically, the second exhaust gas air-fuel ratio detection value, which is obtained after hydrogen is removed, should be regarded as the actual exhaust gas air-fuel ratio. The first exhaust gas air-fuel ratio detection value, which is obtained before hydrogen is removed, is an exhaust gas air-fuel ratio that is richer than the actual exhaust gas air-fuel ratio due to the influence of hydrogen. In other words, the first air-fuel ratio sensor is deceived. As the amount by which the air-fuel ratio in part of the cylinder is richer than the air-fuel ratio in the other cylinders is larger, the amount of hydrogen that is generated in the combustion chambers increases in the quadratic functional manner. Therefore, when the first exhaust gas air-fuel ratio detection value is richer than the second exhaust gas air-fuel ratio detection value by a large amount, that is, when the second exhaust gas air-fuel ratio detection value is leaner than the first exhaust gas air-fuel ratio detection value by a large amount, it is determined that abnormal air-fuel ratio variation among the cylinder has occurred.

Hereafter, description will be provided concerning determination as to whether abnormal air-fuel ratio variation among the cylinders has occurred according to each embodiment based on the principle.

First, a first embodiment will be described. As shown in FIG. 9, a malfunction has occurred in the injector of only the cylinder #1, and the air-fuel ratio in the cylinder #1 is richer than the air-fuel ratio in the other cylinders #2 to #4 by a large amount. In this case, because the main air-fuel ratio feedback control is executed, the total exhaust gas air-fuel ratio that is obtained after the exhaust gas from all the cylinder join together is controlled to a value around the stoichiometric air-fuel ratio, as shown in (A) of FIG. 9. That is, the catalyst upstream-side sensor output Vf is around the stoichiometric-corresponding sensor output Vreff. However, the air-fuel ratio in the cylinder #1 is richer than the stoichiometric air-fuel ratio by a large amount, and the air-fuel ratio in the cylinders #2 to #4 is leaner than the stoichiometric air-fuel ratio. Therefore, the total exhaust gas air-fuel ratio is around the stoichiometric air-fuel ratio. In addition, a large amount of hydrogen is generated in the cylinder #1. Therefore, the output Vf from the catalyst upstream-side sensor 17 erroneously indicates the air-fuel ratio that is richer than the actual air-fuel ratio, as the stoichiometric air-fuel ratio.

When the exhaust gas that contains hydrogen passes through the catalyst 11, the hydrogen is removed and no longer exerts influence on the air-fuel ratio. Therefore, as shown in (B) of FIG. 9, the output Vr from the catalyst downstream-side sensor 18 indicates the actual air-fuel ratio, that is, the air-fuel ratio that is leaner than the stoichiometric air-fuel ratio. That is, the catalyst downstream-side sensor output Vr is a value on the leaner side than the stoichiometric-corresponding sensor output Vrefr.

In other words, in order to offset the rich-deviation of the catalyst upstream-side air-fuel ratio detection value from the stoichiometric air-fuel ratio, which is, for example, 25 in total, a lean-correction of −25 is made in the main air-fuel ratio feedback control to bring the rich-deviation of the catalyst upstream-side air-fuel ratio detection value from the stoichiometric air-fuel ratio to 0. However, 5 out of 25 is caused not due to the air-fuel ratio deviation but due to the influence of hydrogen. Therefore, in the main air-fuel ratio feedback control, the air-fuel ratio is corrected to a value excessively leaner by 5 than the air-fuel ratio that should be achieved. Therefore, the catalyst downstream-side air-fuel ratio is leaner than the stoichiometric air-fuel ratio by 5.

Therefore, although the catalyst upstream-side air-fuel ratio is controlled to the stoichiometric air-fuel ratio by the main air-fuel ratio feedback control, the catalyst downstream-side sensor 18 continuously detects the catalyst downstream-side air-fuel ratio that is leaner than the stoichiometric air-fuel ratio. Therefore, according to the first embodiment, when the catalyst downstream-side sensor 18 continuously detects the catalyst downstream-side air-fuel ratio that is leaner than the stoichiometric air-fuel ratio for a predetermined duration or longer (that is, the catalyst downstream-side sensor output is continuously on the leaner side than the stoichiometric-corresponding sensor output Vrefr) although the catalyst upstream-side air-fuel ratio is controlled to the stoichiometric air-fuel ratio by the main air-fuel ratio feedback control, it is determined that abnormal air-fuel ratio variation among the cylinders has occurred. Such difference in the air-fuel ratio between the upstream side and the downstream side of the catalyst occurs because a considerably large amount of hydrogen is generated due to a malfunction in, for example, the injector of part of the cylinders.

When the catalyst downstream-side sensor 18 detects an exhaust gas air-fuel ratio that is leaner than the stoichiometric air-fuel ratio, the sub-air-fuel ratio feedback control is executed to correct the detected lean exhaust gas air-fuel ratio to a richer value, whereby the fuel injection amount is increased uniformly for all the cylinders. Then, the amount by which the catalyst upstream-side air-fuel ratio detection value is richer than the stoichiometric air-fuel ratio further increases, and the catalyst downstream-side air-fuel ratio is maintained at a lean value. Eventually, the main air-fuel ratio correction amount and the sub-air-fuel ratio correction amount become substantially equal to the values corresponding to the degree of abnormal air-fuel ratio variation.

If a three-way catalyst that is able to store and release oxygen is used as the catalyst 11, when the catalyst stores oxygen, the catalyst exhibits the ability for oxidizing hydrogen more efficiently. Therefore, when it is determined whether abnormal air-fuel ratio variation among the cylinders has occurred, the catalyst may be placed in the oxygen storage state in advance, more specifically, the catalyst upstream-side air-fuel ratio may be controlled to a value leaner than the stoichiometric air-fuel ratio for a predetermined duration.

Figure 11:
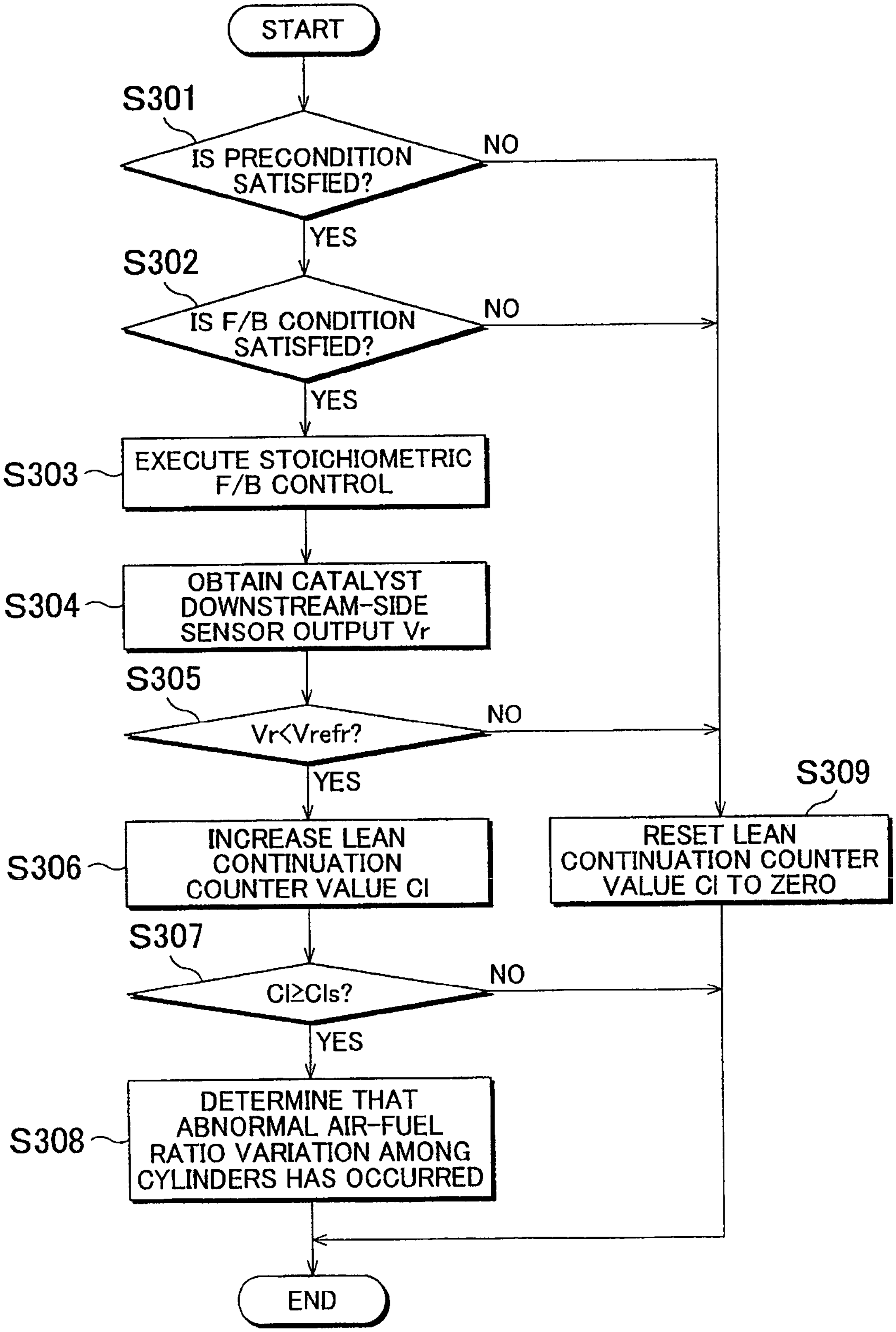
FIG. 11 is a flowchart showing a routine for determining whether abnormal air-fuel ratio variation among the cylinders has occurred according to the first embodiment of the invention.

FIG. 11 is a routine for determining whether abnormal air-fuel ratio variation among the cylinders has occurred according to the first embodiment. The routine is periodically executed by the ECU 20 in predetermined calculation cycles.

In S301, it is determined whether a precondition for determination as to whether abnormal air-fuel ratio variation among the cylinders has occurred (hereinafter, referred to as "abnormal air-fuel ratio variation determination") has been satisfied. The precondition is, for example, a condition that warming-up of the engine has been completed, or a condition that the temperature of the catalyst has reached an activation temperature.

If it is determined that the precondition has not been satisfied, in S309, a count value C1 of a lean continuation counter (described later in detail) is reset to 0, and the routine ends.

On the other hand, if it is determined that the precondition has been satisfied, it is determined in S302 whether an execution condition for executing the main air-fuel ratio feedback control and the sub-air-fuel ratio feedback control has been satisfied. The execution condition is, for examples, a condition that the catalyst upstream-side sensor 17 and the catalyst downstream-side sensor 18 are activated, more specifically, element impedances of the both sensors, which are detected by the ECU 20, are smaller than a predetermined value corresponding to the minimum value of the temperature range in which the sensors are activated.

If it is determined that the condition has not been satisfied, S309 is executed. On the other hand, if it is determined that the condition has been satisfied, S303 is executed. In S303, the main air-fuel ratio feedback control and the sub-air-fuel ratio feedback control (stoichiometric air-fuel ratio feedback control) are executed using the stoichiometric air-fuel ratio as the target air-fuel ratio.

Next, in S304, the output Vr from the catalyst downstream-side sensor 18 is obtained. In S305, it is determined whether the obtained catalyst downstream-side sensor output Vr is smaller than the stoichiometric-corresponding sensor output Vrefr, that is, whether the catalyst downstream-side air-fuel ratio detected by the catalyst downstream-side sensor 18 is leaner than the stoichiometric air-fuel ratio.

If it is determined that the catalyst downstream-side sensor output Vr is equal to or larger than the stoichiometric-corresponding sensor output Vrefr, S309 is executed. On the other hand, if it is determined the catalyst downstream-side sensor output Vr is smaller than the stoichiometric-corresponding sensor output Vrefr, the value indicated by the lean continuation counter provided in the ECU 20 is increased. The lean continuation counter is used to count the duration in which the detection value of the catalyst downstream-side air-fuel ratio is leaner than the stoichiometric air-fuel ratio.

Next, it is determined in S307 whether the count value C1 indicated by the lean continuation counter is equal to or larger than a predetermined value C1*s*, that is, whether the duration during which the detection value of the catalyst downstream-side air-fuel ratio is leaner than the stoichiometric air-fuel ratio has reached a predetermined duration.

If it is determined that the count value C1 is smaller than the predetermined value C1*s*, the routine ends. On the other hand, if it is determined that the count value C1 is equal to or larger than the predetermined value C1*s*, it is determined in S308 that abnormal air-fuel ratio variation among the cylinders has occurred, and the routine ends. After it is determined in S308 that abnormal air-fuel ratio variation among the cylinders has occurred, it is preferable to activate an alarm device such as a check lamp to notify a user that abnormal air-fuel ratio variation among the cylinders has occurred.

Next, a second embodiment will be described. As described with reference to FIGS. 6 to 8, in the sub-air-fuel ratio feedback control, the catalyst downstream-side sensor learned value ΔVrg and the sub-air-fuel ratio correction amount Kr are learned or updated at predetermined time intervals (that is, at predetermined update rate). If abnormal air-fuel ratio variation among the cylinders has occurred due to, for example, a malfunction in the injector of part of the cylinders, the catalyst downstream-side sensor output Vr continuously exhibits a lean value. Therefore, the catalyst downstream-side sensor learned value ΔVrg and the sub-air-fuel ratio correction amount Kr are large positive values with which the air-fuel ratio that is leaner than the stoichiometric air-fuel ratio by a large amount is corrected to the stoichiometric air-fuel ratio.

Figure 12:
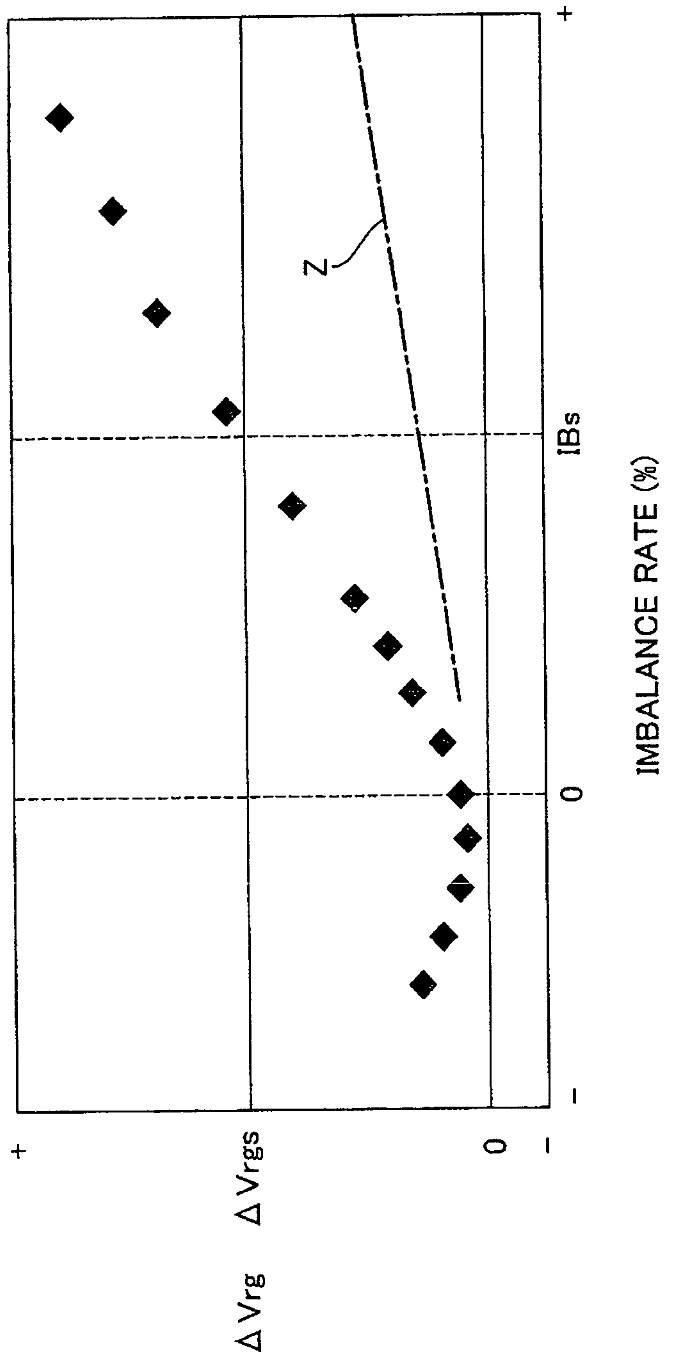
FIG. 12 is a graph showing the result of a test in which the relationship between an imbalance rate and a learned value obtained by the catalyst downstream-side sensor is examined.

This is shown in FIG. 12. FIG. 12 is a graph showing the result of a test in which the relationship between the deviation rate when the fuel injection amount for only one cylinder among all the cylinders deviates from the stoichiometric-corresponding amount, that is, the imbalance rate (%), and the catalyst downstream-side sensor learned value ΔVrg. When the fuel injection amount is a value corresponding to an air-fuel ratio richer than the stoichiometric air-fuel ratio, the imbalance rate is a positive value. On the other hand, when the fuel injection amount is a value corresponding to an air-fuel ratio leaner than the stoichiometric air-fuel ratio, the imbalance rate is a negative value. As shown in FIG. 12, as the imbalance rate is larger in such a manner that the fuel injection amount is a value corresponding to an air-fuel ratio richer than the stoichiometric air-fuel ratio by a larger amount, the catalyst downstream-side sensor learned value ΔVrg exhibits a larger value, that is, a value that corrects the air-fuel ratio to a value richer than the stoichiometric air-fuel ratio by a larger amount.

Therefore, according to the second embodiment, when the catalyst downstream-side sensor learned value ΔVrg is equal to or larger than a malfunction determination value ΔVrgs, it is determined that abnormal air-fuel ratio variation among the cylinders has occurred. Alternatively, when the sub-air-fuel ratio correction amount Kr that is calculated based on the catalyst downstream-side sensor learned value ΔVrg is equal to or larger than a predetermined value Krs, it is determined that abnormal air-fuel ratio variation among the cylinders has occurred.

As shown in FIG. 12, the imbalance rate corresponding to the malfunction determination value ΔVrgs is denoted by IBs. The imbalance rate IBs is the minimum value of the imbalance rate that is not permissible in the view of, for example, exhaust emission. FIG. 12 shows the slope of the catalyst downstream-side sensor learned value ΔVrg when the air-fuel ratio in only one cylinder deviates from the stoichiometric air-fuel ratio (that is, when imbalance malfunction has occurred). However, when the air-fuel ratios in all the cylinders equally deviate from the stoichiometric air-fuel ratio (that is, when balance malfunction has occurred), the slope of the catalyst downstream-side sensor learned value ΔVrg is far more moderate, as indicated by a virtual line Z in FIG. 12. This is because, when the air-fuel ratios in all the cylinders equally deviate from the stoichiometric air-fuel ratio, the air-fuel ratios are corrected easily and uniformly by the main air-fuel ratio control. Therefore, the influence on the sub-air-fuel ratio correction amount is small. When the air-fuel ratios in all the cylinders equally deviate from the stoichiometric air-fuel ratio by a large amount, the correction amount used in the main air-fuel ratio control becomes larger. Therefore, abnormal air-fuel ratio variation among the cylinders may be detected by the abnormality determination means that determines whether abnormal air-fuel ratio variation among the cylinders has occurred based on the main air-fuel ratio correction amount, before the abnormal air-fuel ratio variation is detected according to the second embodiment.

The air-fuel ratio in part of the cylinders may be leaner than the air-fuel ratio in the other cylinders. In this case, the value of the catalyst downstream-side sensor learned value ΔVrg is as shown in the negative imbalance rate region in FIG. 12. The slope of the catalyst downstream-side sensor learned value ΔVrg in this region is more moderate than that in the positive imbalance rate region. When the air-fuel ratio is leaner than the stoichiometric air-fuel ratio, the fuel injection amount is smaller than a prescribed amount. When the air-fuel ratio in one of the cylinders is leaner than the stoichiometric air-fuel ratio by a large amount, usually, a misfire occurs in this cylinder. Therefore, abnormal air-fuel ratio variation among the cylinders due to the air-fuel ratio in the one cylinder that is leaner than the stoichiometric air-fuel ratio is detected by a misfire detection means. The abnormal air-fuel ratio variation determination according to the second embodiment is particularly advantageous for abnormal air-fuel ratio variation among the cylinders due to the air-fuel ratio in part of the cylinders, which is richer than the stoichiometric air-fuel ratio.

Figure 13:
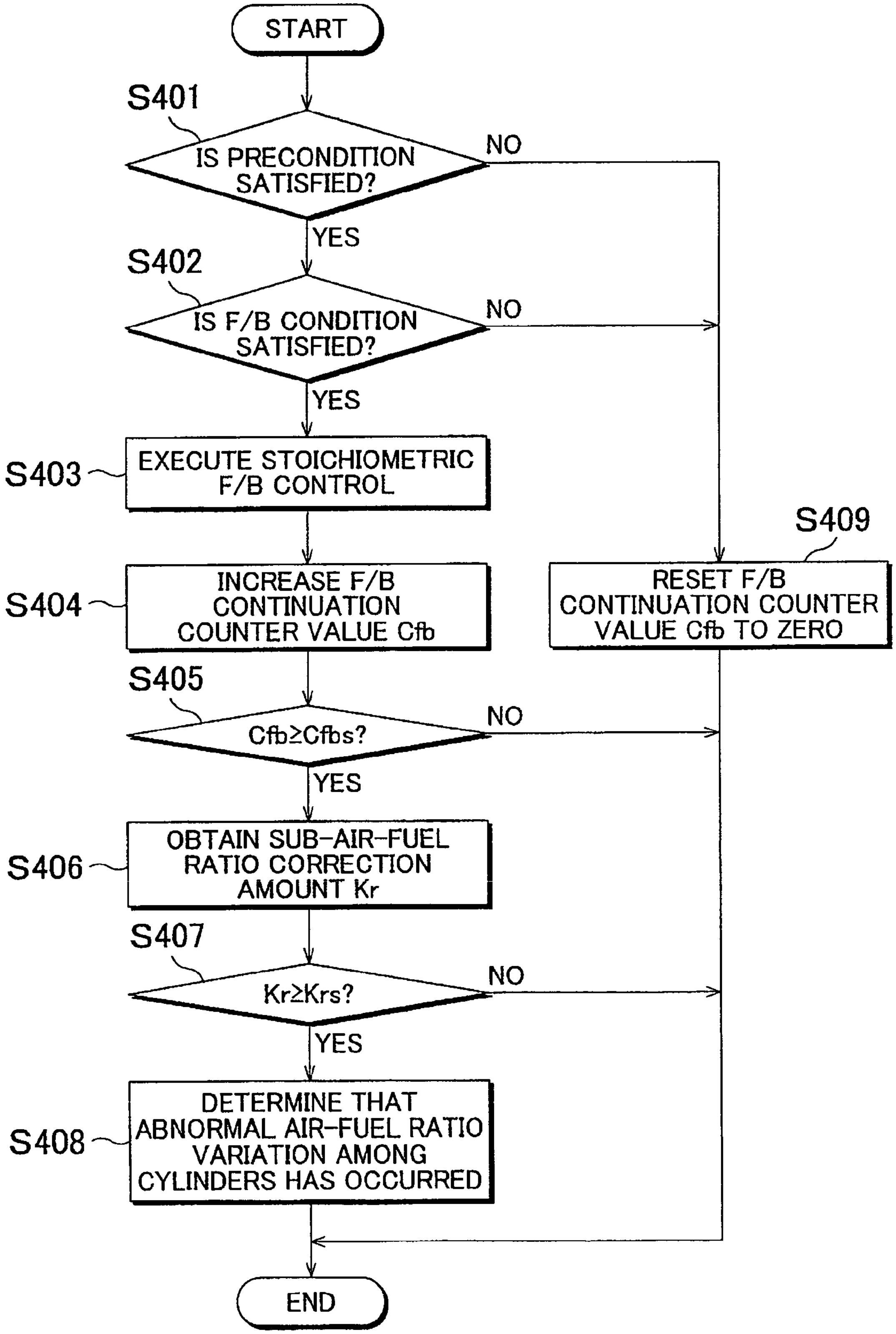
FIG. 13 is a flowchart showing a routine for determining whether abnormal air-fuel ratio variation among the cylinders has occurred according to a second embodiment of the invention.

FIG. 13 shows a routine for determining whether abnormal air-fuel ratio variation among the cylinders has occurred according to the second embodiment. The routine is periodically executed by the ECU 20 in predetermined calculation cycles.

In S401 as well as in S301, it is determined whether a precondition for abnormal air-fuel ratio variation determination has been satisfied. If it is determined that the precondition has not been satisfied, a count value Cfb indicated by a feedback continuation counter (described later in detail) is reset to 0 in S409, and the routine ends.

On the other hand, if it is determined that the precondition has been satisfied, it is determined in S402, as in S302, whether an execution condition for executing the main air-fuel ratio feedback control and the sub-air-fuel ratio feedback controls has been satisfied. If it is determined that the execution condition has not been satisfied, the count value Cfb indicated by the feedback continuation counter is reset to 0 in S409, and the routine ends.

On the other hand, if it is determined that the execution condition has been satisfied, S403 is executed. In S403 as well as in S303, the stoichiometric feedback control is executed.

Next, in S404, the value indicated by the feedback continuation counter provided in the ECU 20 is increased. The feedback continuation counter is used to count the duration during which the stoichiometric feedback control is executed. The duration during which the stoichiometric feedback control is executed is counted in order to wait until the catalyst downstream-side sensor learned value ΔVrg and the sub-air-fuel ratio correction amount Kr are updated to the values corresponding to the air-fuel ratio variation among the cylinders.

Next, in S405, it is determined whether the count value Cfb indicated by the feedback continuation counter is equal to or larger than a predetermined value Cfbs, that is, whether a time, which is sufficiently long for the catalyst downstream-side sensor learned value ΔVrg and the sub-air-fuel ratio correction amount Kr to be updated to the values corresponding to the air-fuel ratio variation among the cylinders, has elapsed.

If it is determined that the count value Cfb is smaller than the predetermined value Cfbs, the routine ends. On the other hand, if it is determined that the count value Cfb is equal to or larger than the predetermined value Cfbs, the current value of the sub-air-fuel ratio correction amount Kr is obtained in S406.

In S407, it is determined whether the obtained sub-air-fuel ratio correction amount Kr is equal to or larger than the predetermined value Krs.

If it is determined that the sub-air-fuel ratio correction amount Kr is smaller than the predetermined value Krs, the routine ends. On the other hand, if it is determined that the sub-air-fuel ratio correction amount Kr is equal to or larger than the predetermined value Krs, it is determined in S408 that abnormal air-fuel ratio variation among the cylinders has occurred, and the routine ends.

In this case, whether abnormal air-fuel ratio variation among the cylinders has occurred is determined by comparing the sub-air-fuel ratio correction amount Kr with the predetermined value. Alternatively, whether abnormal air-fuel ratio variation among the cylinders has occurred may be determined by comparing the catalyst downstream-side sensor learned value ΔVrg with a predetermined value.

Next, a third embodiment will be described. As described in the first embodiment, when abnormal air-fuel ratio variation among the cylinders has occurred, even if the catalyst upstream-side air-fuel ratio is controlled to the stoichiometric air-fuel ratio, the catalyst downstream-side air-fuel ratio is leaner than the stoichiometric air-fuel ratio due to the influence of hydrogen. Therefore, even if the catalyst upstream-side air-fuel ratio is forcibly controlled to a value richer than the stoichiometric air-fuel ratio, the catalyst downstream-side air-fuel ratio is leaner than the stoichiometric air-fuel ratio.

Figure 14:
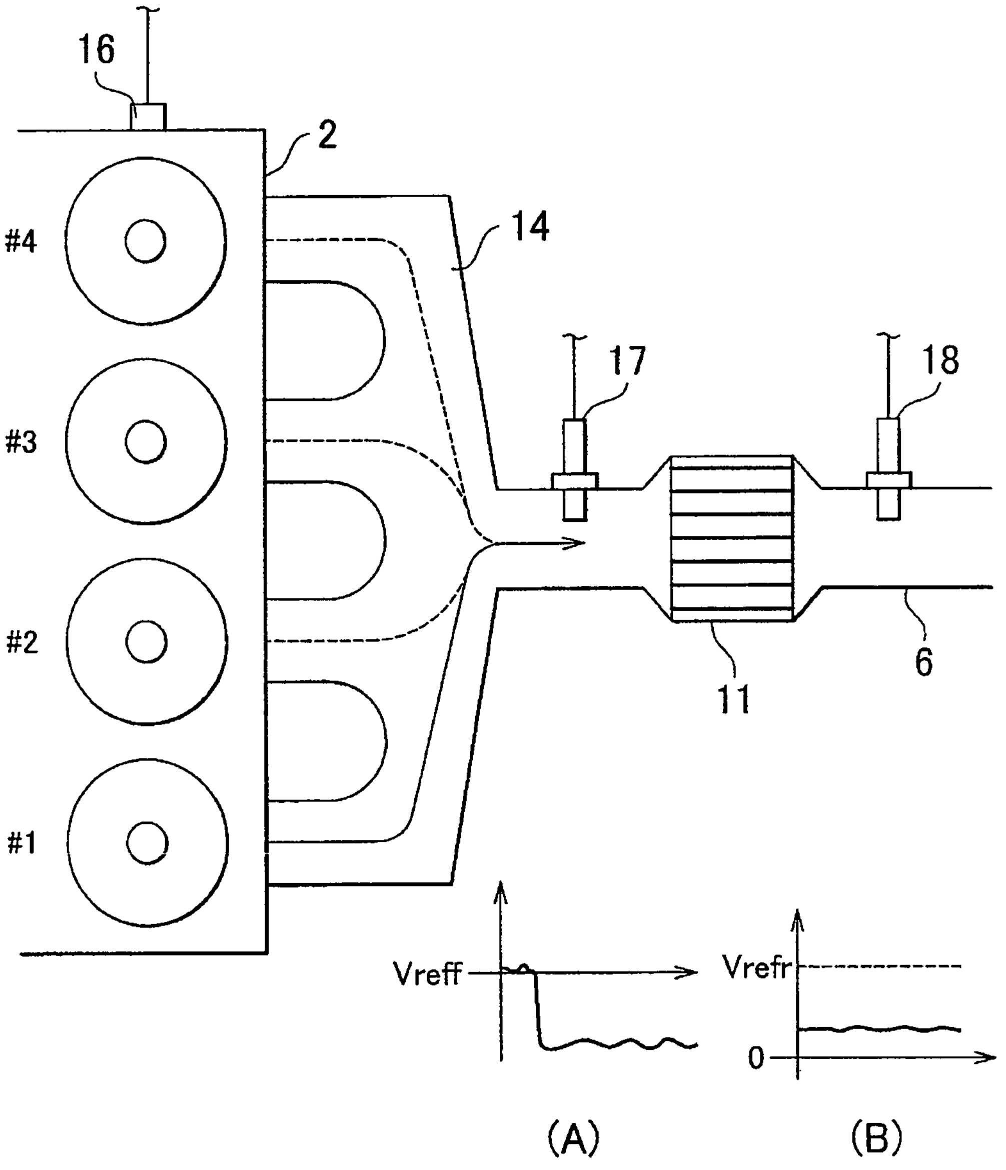
FIG. 14 is a view illustrating determination as to whether abnormal air-fuel ratio variation among the cylinders has occurred according to a third embodiment of the invention.

Therefore, in the third embodiment, as shown in FIG. 14, a target air-fuel ratio that is used in the main air-fuel ratio feedback control is forcibly set to a value (e.g. 14.1) that is richer than the stoichiometric air-fuel ratio which is the reference value, and forcible rich feedback control is executed as the main air-fuel ratio feedback control. Then, if the catalyst downstream-side sensor 18 continuously detects an exhaust gas air-fuel ratio, which is leaner than the stoichiometric air-fuel ratio, it is determined that abnormal air-fuel ratio variation among the cylinders has occurred. The target air-fuel ratio that is used in the sub-air-fuel ratio feedback control is maintained at the stoichiometric air-fuel ratio.

Figure 15:
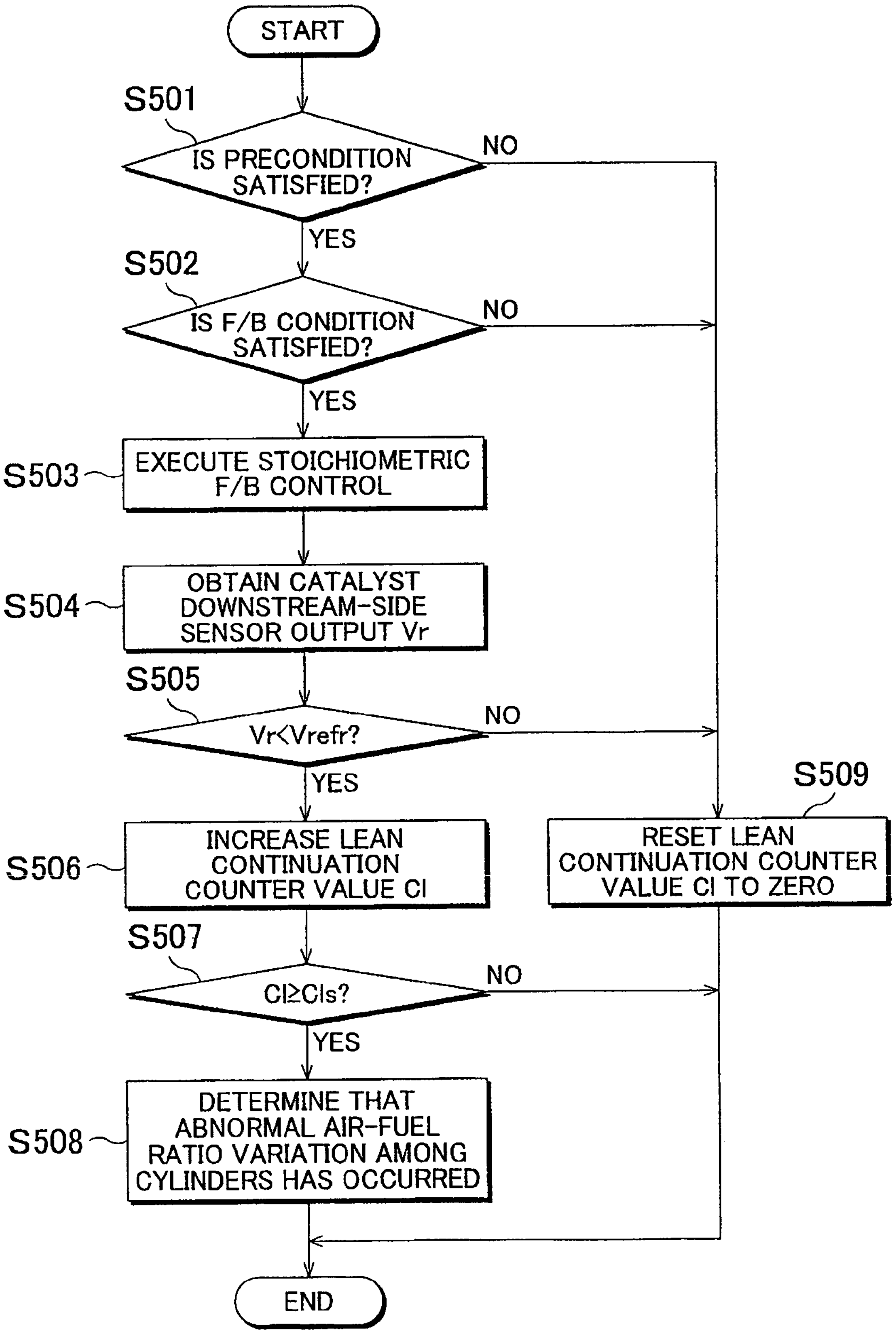
FIG. 15 is a flowchart showing a routine for determining whether abnormal air-fuel ratio variation among the cylinders has occurred according to the third embodiment of the invention.

FIG. 15 shows a routine for determining whether abnormal air-fuel ratio variation among the cylinders has occurred according to the third embodiment. The routine is mostly the same as the routine according to the first embodiment shown in FIG. 11. The routine according to the third embodiment differs from the routine according to the first embodiment only in that the forcible rich feedback control instead of the stoichiometric feedback control is executed as the main air-fuel ratio feedback control.

As a modification, the sub-air-fuel ratio control amount may be obtained as in the second embodiment after the forcible rich feedback control is executed, and whether abnormal air-fuel ratio variation among the cylinders has occurred may be determined based on the obtained sub-air-fuel ratio control amount.

Next, a fourth embodiment will be described. In the first to third embodiments, whether abnormal air-fuel ratio variation among the cylinders has occurred is determined based on the amount by which the catalyst downstream-side air-fuel ratio detected by the catalyst downstream-side sensor 18 is leaner than the catalyst upstream-side air-fuel ratio detected by the catalyst upstream-side sensor 17. In contrast, according to the fourth embodiment, a catalyst upstream-side air-fuel ratio that is detected by a catalyst upstream-side sensor with a catalyst is used instead of the catalyst downstream-side air-fuel ratio that is detected by the catalyst downstream-side sensor 18.

Figure 16:
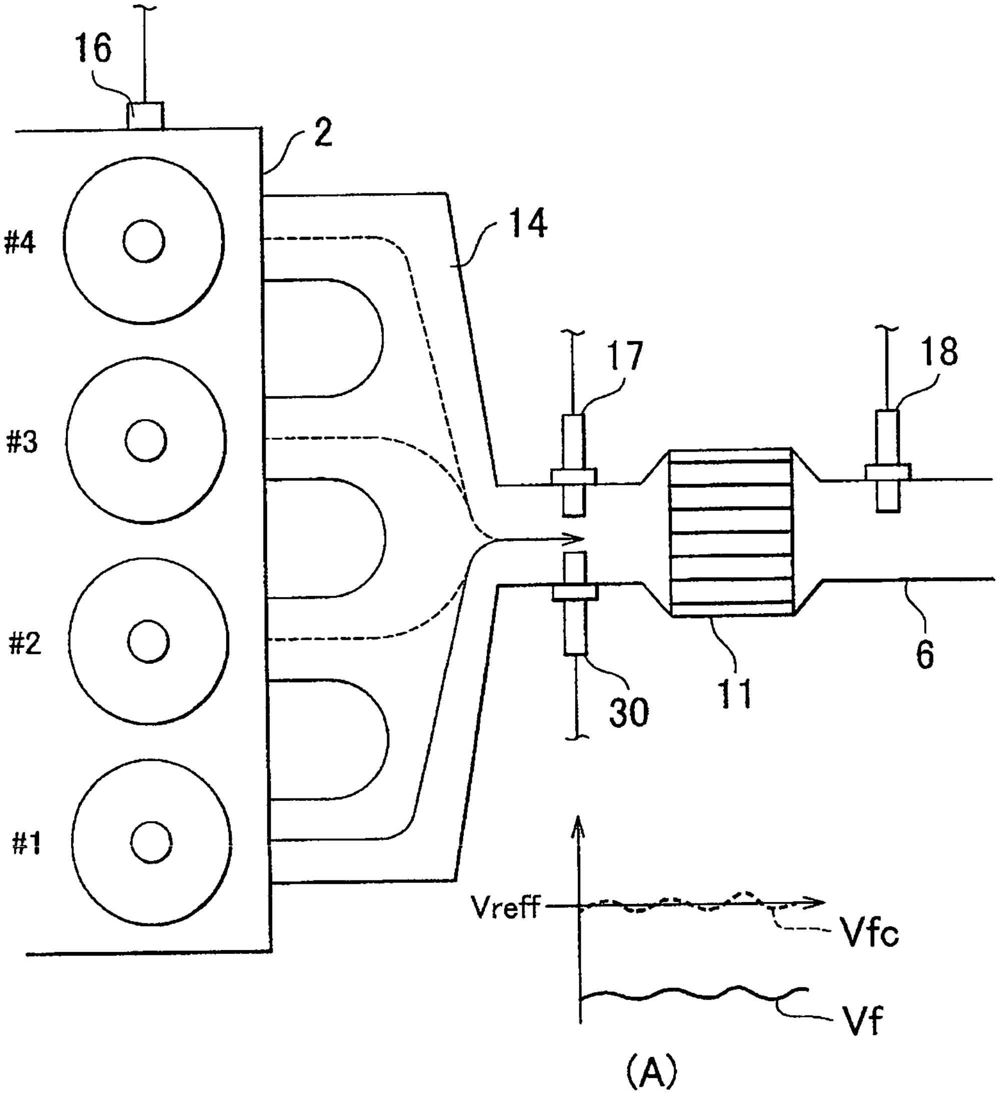
FIG. 16 is a view illustrating determination as to whether abnormal air-fuel ratio variation among the cylinders has occurred according to a fourth embodiment of the invention.

The structure according to the fourth embodiment is shown in FIG. 16. The structures other than the structure shown in FIG. 16 are the same as those in FIG. 1. A catalyst upstream-side sensor 30 with a catalyst is disposed upstream of the catalyst 11, more specifically, in the exhaust passage at a position immediately upstream of the catalyst 11. The catalyst upstream-side sensor 30 with a catalyst is arranged at substantially the same position as that of the catalyst upstream-side sensor 17. The catalyst upstream-side sensor 30 with a catalyst is formed by providing a catalyst layer in a sensor element of an air-fuel ratio sensor that has the same structure as that of the catalyst upstream-side sensor 17. According to the fourth embodiment, the catalyst upstream-side sensor 30 with a catalyst functions as the second air-fuel ratio sensor according to the invention, instead of the catalyst downstream-side sensor 18. Instead of the catalyst 11, the catalyst layer that is arranged in the sensor element of the catalyst upstream-side sensor 30 with a catalyst functions as the catalyst element according to the invention.

The catalyst layer in the catalyst upstream-side sensor 30 with a catalyst oxidizes and burns hydrogen contained in the exhaust gas to remove it. Therefore, the air-fuel ratio of the exhaust gas, from which hydrogen has been removed by the catalyst layer, is detected by the catalyst upstream-side sensor 30 with a catalyst.

Figure 17:
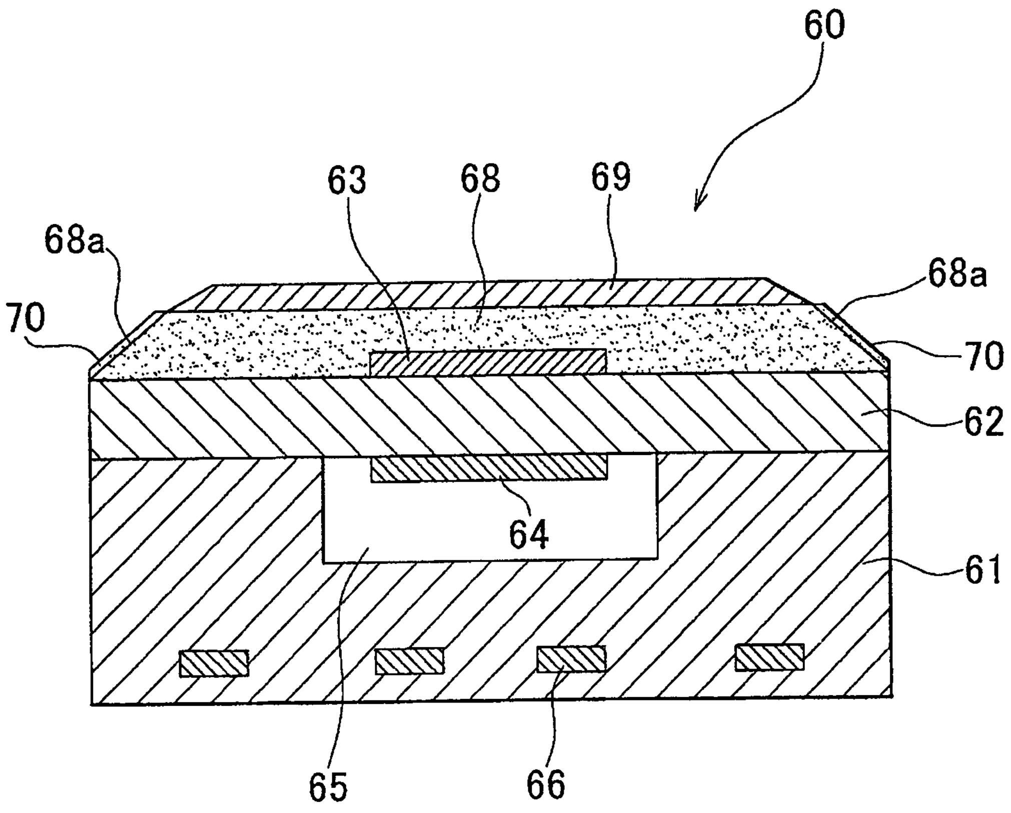
FIG. 17 is a cross-sectional view showing a sensor element of a catalyst upstream-side sensor with a catalyst.

FIG. 17 is a cross-sectional view showing the sensor element of the catalyst upstream-side sensor 30 with a catalyst. A sensor element 60 includes an insulation layer 61, a plate-like solid electrolyte 62 that is fixed to the insulation layer 61, and paired electrodes 63 and 64 that are provided on the respective faces of the solid electrolyte 62. For example, the insulation layer 61 is made of high thermal conductive ceramics such as alumina. The solid electrolyte 62 is formed of a sheet that is made of partially-stabilized zirconia. The electrodes 63 and 64 are made of platinum. An atmospheric air chamber 65 is formed in the insulation layer 61, at a portion that faces the inner electrode 64. Therefore, the electrode 64 is exposed to the atmosphere. Heaters 66 are embedded in the insulation layer 61. A diffusion resistance layer 68 that is formed of, for example, porous ceramics, is formed on the exhaust-side electrode 63 and the solid electrolyte 62. A shielding layer 69 is formed on the diffusion resistance layer 68. The exhaust gas in the element atmosphere enters through an inlet face **68*a* of the diffusion resistance layer 68 into the diffusion resistance layer 68, diffuses in the diffusion resistance layer 68, and reaches the exhaust-side electrode 63. At this time, a limiting current corresponding to the oxygen concentration of the gas that has reached the exhaust-side electrode 63 flows between the electrodes 63 and 64**, and the sensor outputs a value based on the limiting current.

The catalyst upstream-side sensor 30 with a catalyst is formed by arranging a catalyst layer 70 on the inlet face **68*a* of the diffusion resistance layer 68. Hydrogen in the exhaust gas is removed by the catalyst layer 70, and the gas, from which hydrogen has been removed, is detected by the exhaust-side electrode 63. Like the catalyst 11, the catalyst layer 70 contains noble metal (e.g. Pt) that forms an active spot. The catalyst layer 70 is able to remove, in addition to hydrogen, other toxic elements in the exhaust gas (NOx, HC, CO). The catalyst layer 70 does not interrupt gas flow. The structure of the catalyst upstream-side sensor 17 matches the structure obtained by excluding the catalyst layer 70 from the catalyst upstream-side sensor 30** with a catalyst.

As shown in (A) of FIG. 16, if abnormal air-fuel ratio variation among the cylinders has occurred, an output Vfc from the catalyst upstream-side sensor 30 with a catalyst is leaner than the output Vf from the catalyst upstream-side sensor 17 by a large amount. Therefore, whether abnormal air-fuel ratio variation among the cylinders has occurred is determined by monitoring the difference between the output from the catalyst-upstream side sensor 30 with a catalyst and the output from the catalyst upstream-side sensor 17. (A) of FIG. 16 shows an example when the main air-fuel ratio control based on the catalyst upstream-side sensor output Vf is not executed. The catalyst upstream-side sensor output Vf is not controlled to the value corresponding to the stoichiometric air-fuel ratio. However, even if the main air-fuel ratio control based on the catalyst upstream-side sensor output Vf is executed, the output from the catalyst upstream-side sensor 30 with a catalyst deviates from the output from the catalyst upstream-side sensor 17 in the same manner.

Figure 18:
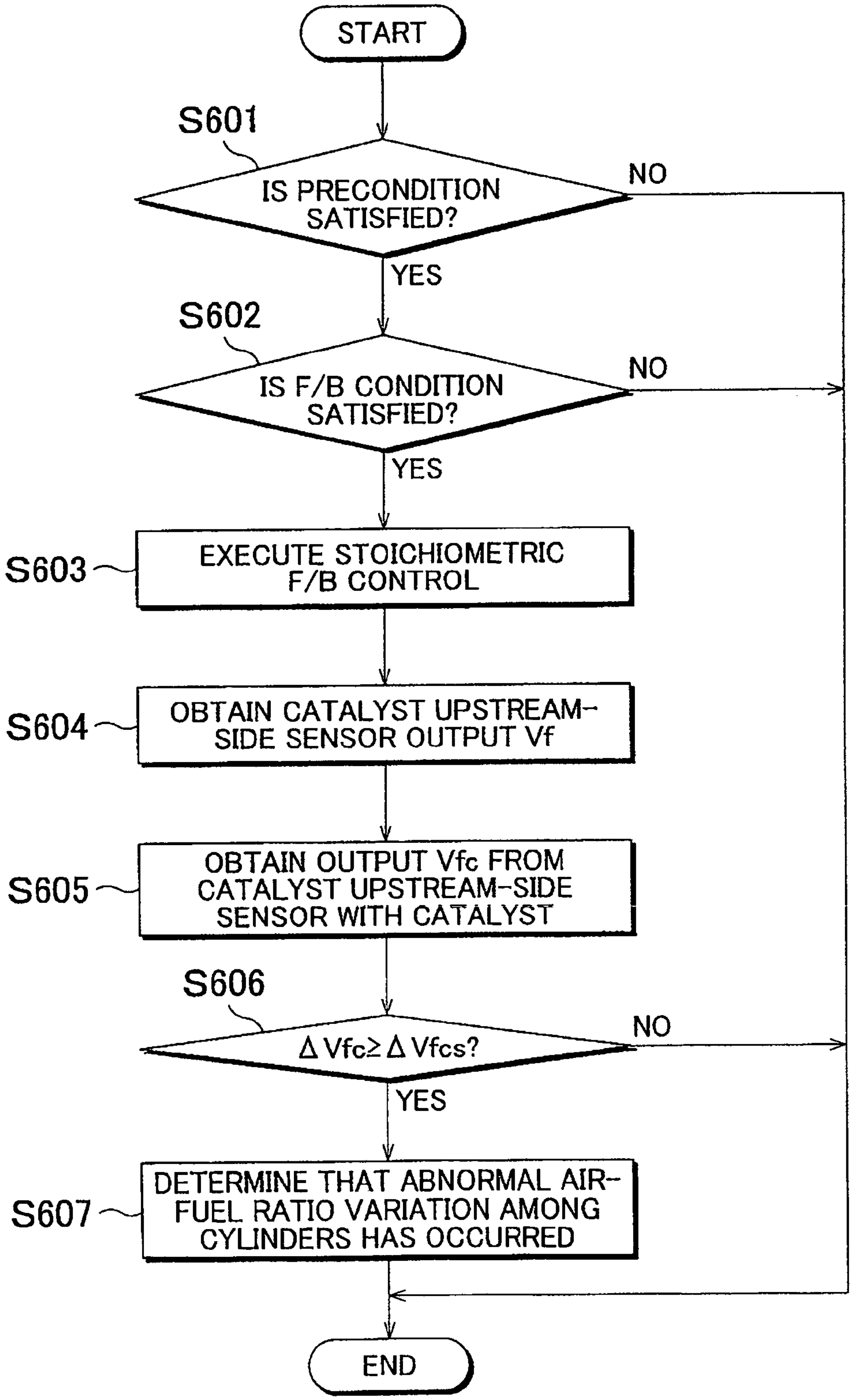
FIG. 18 is a flowchart showing a routine for determining whether abnormal air-fuel ratio variation among the cylinders has occurred according to the fourth embodiment of the invention.

FIG. 18 shows a routine for determining whether abnormal air-fuel ratio variation among the cylinders has occurred according to the fourth embodiment. S601 to S603 are the same as S301 to S303, respectively. The stoichiometric feedback control is executed in order to make the air-fuel ratio condition uniform, thereby improving the accuracy of determination.

Next, in S604, the catalyst upstream-side sensor output Vf is obtained. Then, the output Vfc from the catalyst upstream-side sensor with a catalyst 30 is obtained in S605.

Then, in S606, the difference between the outputs from these sensors ($\Delta Vfc = Vfc - Vf$) is calculated, and it is determined whether the difference $\Delta Vfc$ is equal to or larger than a predetermined value $\Delta Vfcs$. If it is determined that the difference $\Delta Vfc$ is not equal to or larger than the predetermined value $\Delta Vfcs$, the routine ends. On the other hand, if it is determined that the difference $\Delta Vfc$ is equal to or larger than the predetermined value $\Delta Vfcs$, it is determined in S607 that abnormal air-fuel ratio variation among the cylinders has occurred, and the routine ends.

Next, a fifth embodiment will be described. The structure in the fifth embodiment is mostly the same as the structure in the above-described embodiment shown in FIG. 1. The same elements will be denoted by the same reference numerals. Hereafter, mainly the difference between the fifth embodiment and the above-described embodiment will be described.

Figure 19:
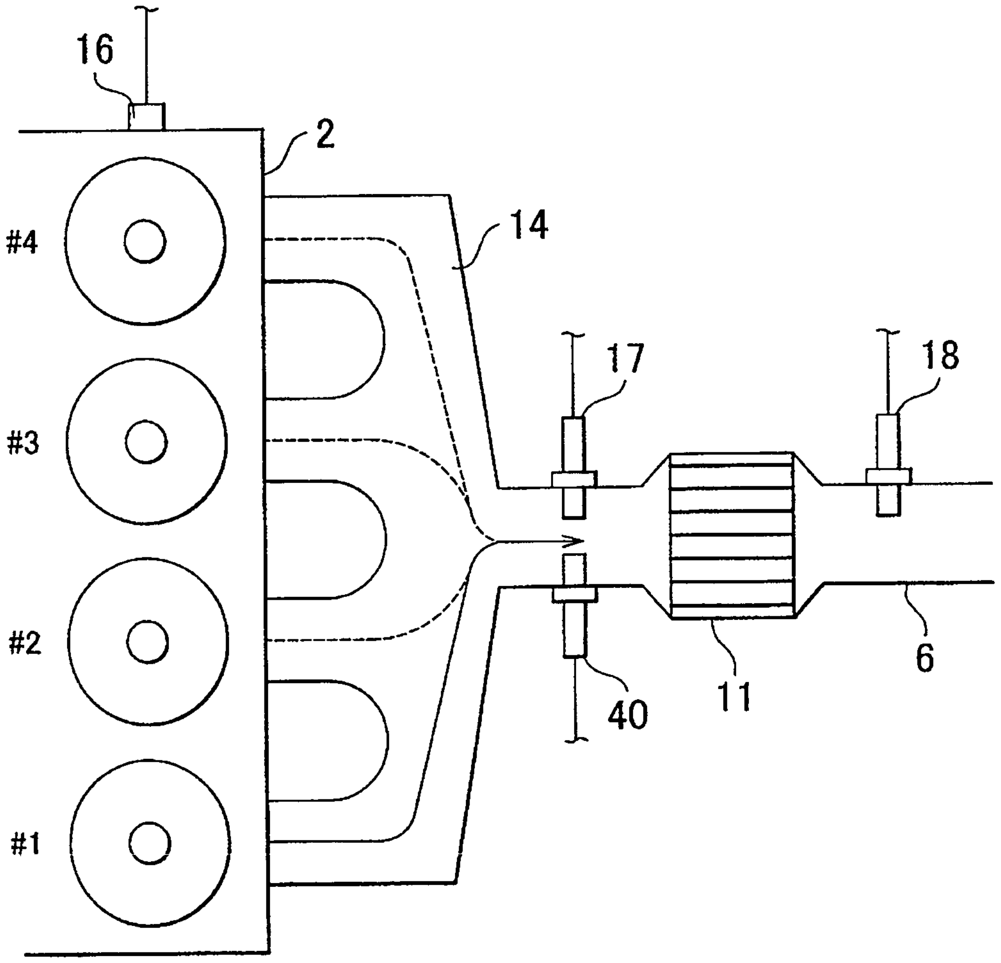
FIG. 19 is a view schematically showing the structure of a main portion according to a fifth embodiment of the invention.

As shown in FIG. 19, in the fifth embodiment, a hydrogen concentration sensor 40 that detects the hydrogen concentration in the exhaust gas is arranged upstream of the catalyst 11, more specifically, in the exhaust passage at a position immediately upstream of the catalyst 11. The hydrogen concentration sensor 40 is arranged at substantially the same position as that of the catalyst upstream-side sensor 17.

In the fifth embodiment, the ECU 20 determines whether abnormal air-fuel ratio variation among the cylinders has occurred based on an output from the hydrogen concentration sensor 40. That is, if abnormal air-fuel ratio variation among the cylinders has occurred, the hydrogen concentration in the exhaust gas increases. Therefore, whether abnormal air-fuel ratio variation among the cylinders has occurred is determined using this phenomenon. More specifically, when the output from the hydrogen concentration sensor 40 or the hydrogen concentration that is detected based on the output from the hydrogen concentration sensor 40 is equal to or larger than a predetermined value, it is determined that abnormal air-fuel ratio variation among the cylinders has occurred. Alternatively, when an output integrated value that is obtained by integrating the output from the hydrogen concentration sensor 40 for a predetermined duration or an integrated hydrogen concentration that is calculated based on the output integrated value is equal to or larger than a predetermined value, it is determined that abnormal air-fuel ratio variation among the cylinders has occurred. When such determination is made, it is preferable to use the output from the hydrogen concentration sensor during execution of at least the main air-fuel ratio feedback control. As long as the main air-fuel ratio feedback control is executed, the hydrogen concentration in the exhaust gas is supposed to fall within a predetermined range. Conversely, if the hydrogen concentration in the exhaust gas is equal to or higher than a predetermined value, it is determined that abnormal air-fuel ratio variation among the cylinders has occurred. As a matter of course, the sub-air-fuel ratio feedback control may be executed in addition to the main air-fuel ratio feedback control.

As can be understood from the above description, according to each embodiment, it is not necessary to detect air-fuel ratio fluctuations that are in synchronization with engine rotation. Therefore, the air-fuel ratio sensor need not be a highly-responsive one. Accordingly, even a sensor which has been deteriorated to some extent and have reduced response may be used. A high-speed processing data sample and a high-power ECU are not required. In addition, high-resistance to disturbance and high robustness are provided. Also, there is no restriction on the engine operating conditions and the position at which the sensor is arranged. Therefore, each embodiment described above is considerably practical. According to each embodiment described above, it is possible to determine whether abnormal air-fuel ratio variation among the cylinders has occurred with high accuracy.

Figure 20:
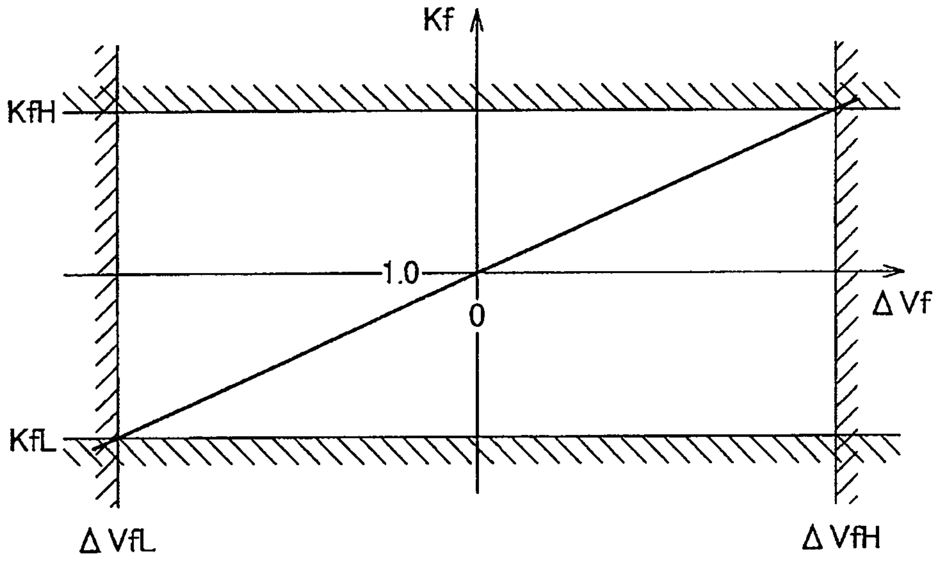
FIG. 20 is a map for calculating a main air-fuel ratio correction amount.

A description concerning the abnormality determination means described above will be provided below. When the main air-fuel ratio feedback control and the sub-air-fuel ratio feedback control are executed, the control amount is kept within a predetermined guard range. As shown in FIG. 20, the catalyst upstream-side sensor output deviation $\Delta Vf$ in the main air-fuel ratio feedback control takes only a value within a range between an upper limit guard value $\Delta VfH$ and a lower limit guard value $\Delta VfL$ ($\Delta VfL \le \Delta Vf \le \Delta VfH$) in the control. In accordance with this, the main air-fuel ratio correction amount Kf takes only a value within a range between an upper limit guard value KfH and a lower limit guard value KfL ($KfL \le Kf \le KfH$). For example, when the calculated catalyst upstream-side sensor output deviation $\Delta Vf$ is equal to or larger than the upper limit guard value $\Delta VfH$, it is determined that the catalyst upstream-side sensor output deviation $\Delta Vf$ has reached the upper limit guard value $\Delta VfH$, and the catalyst upstream-side sensor output deviation $\Delta Vf$ is fixed to the upper limit guard value $\Delta VfH$ in the control. At the same time, it is determined that a malfunction which exerts an influence on all the cylinders has occurred in the fuel supply system or the air system (i.e., a balance malfunction has occurred). Thus, it is possible to avoid the situation in which the main air-fuel ratio control is executed using abnormally large control amount although a malfunction that exerts an influence on all the cylinders has occurred in the fuel supply system or the air system.

Figure 21:
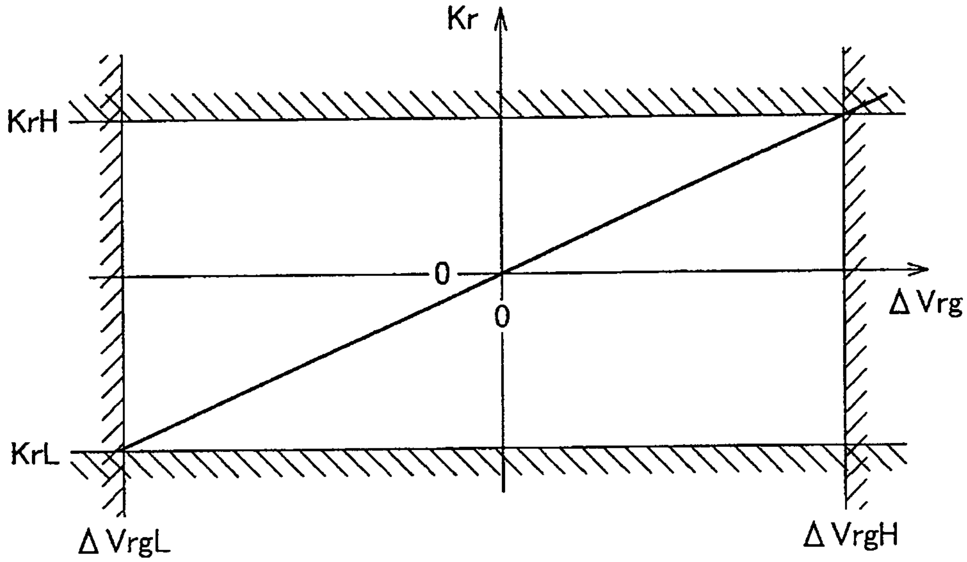
FIG. 21 is a map for calculating a sub-air-fuel ratio correction amount.

Similarly, as shown in FIG. 21, in the sub-air-fuel ratio feedback control, the catalyst downstream-side sensor learned value $\Delta Vrg$ takes only a value within a range between an upper limit guard value $\Delta VrgH$ and a lower limit guard value $\Delta VrgL$ ($\Delta VrgL \le \Delta Vrg \le \Delta VrgH$). In accordance with this, the sub-air-furl ratio correction amount Kr takes only a value within a range between an upper limit guard value KrH and a lower limit guard value KrL ($KrL \le Kr \le KrH$). For example, when the calculated catalyst downstream-side sensor learned value $\Delta Vrg$ is equal to or larger than the upper limit guard value $\Delta VrgH$, it is determined that the catalyst downstream-side sensor learned value $\Delta Vrg$ has reached the upper limit guard value $\Delta VrgH$. The catalyst downstream-side sensor learned value $\Delta Vrg$ is fixed to the upper limit guard value $\Delta VrgH$ in the control. At the same time, it is determined that a malfunction that exerts an influence on all the cylinders has occurred in the fuel supply system or the air system (i.e., a balance malfunction has occurred). Thus, it is possible to avoid the situation in which the sub-air-fuel ratio control is executed using abnormally large control amount although a malfunction that exerts an influence on all the cylinders has occurred in the fuel supply system or the air system.

Figure 22:
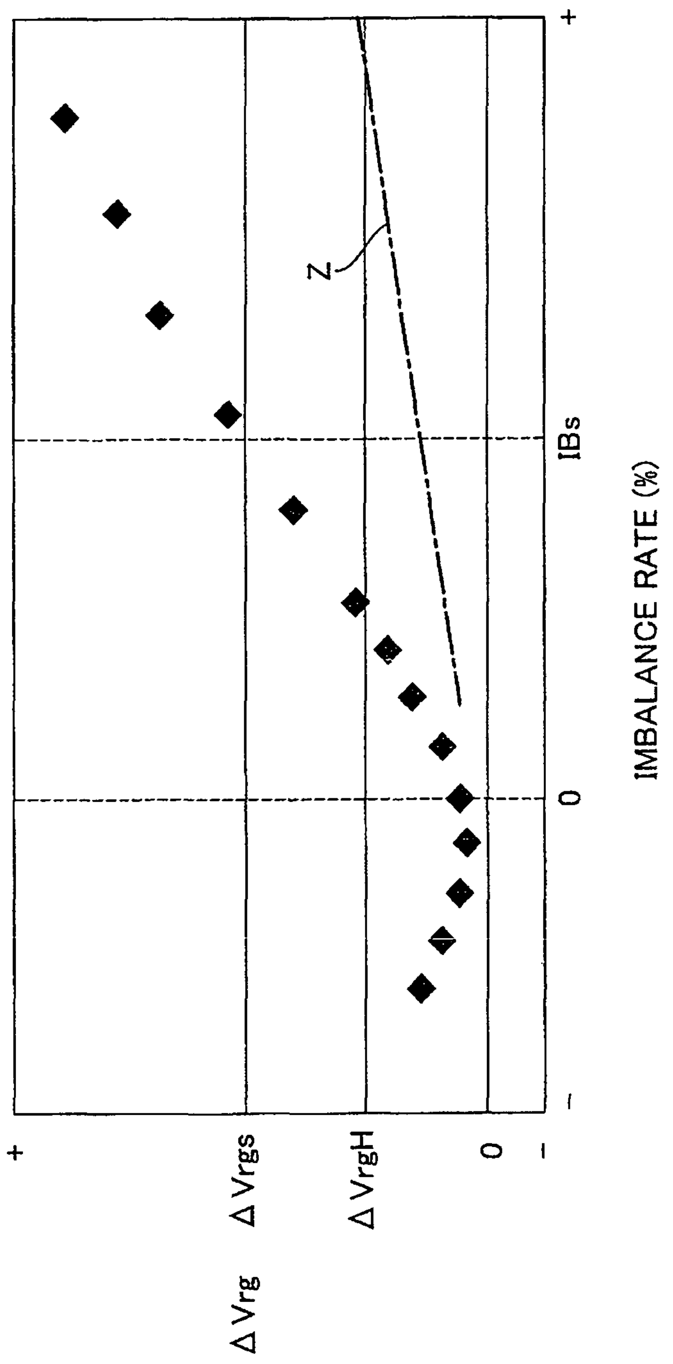
FIG. 22 is a graph showing the result of a test in which the relationship between an imbalance rate and a learned value obtained by the catalyst downstream-side sensor is examined.

If the guard range is set in the above-described manner, the following problem will occur when it is determined whether abnormal air-fuel ratio variation among the cylinders has occurred. As shown in FIG. 22, when a balance malfunction has occurred, the relationship between the imbalance rate and the catalyst downstream-side sensor learned value $\Delta Vrg$ is as indicated by a virtual line Z in FIG. 22. The guard range, especially, the upper limit guard value $\Delta VrgH$ is set based on the relationship. Therefore, when a balance malfunction has occurred, the catalyst downstream-side sensor learned value $\Delta Vrg$ is increased along the virtual line Z. When the catalyst downstream-side sensor learned value $\Delta Vrg$ is equal to or larger than the upper limit guard value $\Delta VrgH$, it is determined that a balance malfunction has occurred.

However, in many cases, the malfunction determination value $\Delta Vrgs$ that is appropriate to determine whether an imbalance malfunction has occurred is larger than the upper limit guard value $\Delta VrgH$ that is appropriate to determine whether a balance malfunction has occurred. Therefore, it is sometimes not possible to detect an imbalance malfunction due to the relationship between the malfunction determination value $\Delta Vrgs$ and the upper limit guard value $\Delta VrgH$. More specifically, even if the actual catalyst downstream-side sensor learned value $\Delta Vrg$ is increased due to an imbalance malfunction, the actual catalyst downstream-side sensor learned value ΔVrg reaches the upper limit guard value ΔVrgH before reaching the malfunction determination value ΔVrgs. Therefore, it is erroneously determined that a balance malfunction has occurred.

Therefore, in order to solve this problem, in a sixth embodiment, when a determination as to whether abnormal air-fuel ratio variation among the cylinders has occurred is made, the guard range in the sub-air-fuel ratio feedback control is increased so as to include at least the malfunction determination value ΔVrgs. More specifically, the upper limit guard value ΔVrgH is changed to a value that is equal to or larger than the malfunction determination value ΔVrgs (value equal to the malfunction determination value ΔVrgs in the sixth embodiment). Thus, the catalyst downstream-side sensor learned value ΔVrg may be changed to a value that is larger than the upper limit guard value ΔVrgH of the prescribed guard range, that is, the catalyst downstream-side sensor learned value ΔVrg is able to take a value that is larger than the prescribed upper limit guard value ΔVrgH in the control. Therefore, the catalyst downstream-side sensor learned value ΔVrg is able to reach the malfunction determination value ΔVrgs. As a result, it is possible to determine whether abnormal air-fuel ratio variation among the cylinders has occurred without any problems.

Alternatively, the guard range for the sub-air-fuel ratio correction amount Kr may be increased. More specifically, the upper limit guard value KrH of the sub-air-fuel ratio correction amount Kr may be changed to a value equal to or larger than the sub-air-fuel ratio correction amount corresponding to the malfunction determination value ΔVrgs. When these guard ranges are increased, the lower limit guard value need not be changed, or may be changed to a smaller value to further increase the guard range. Further alternatively, execution of the sub-air-fuel ratio control may be permitted even if the control amount is outside the guard range. In other words, the sub-air-fuel ratio control using the control amount that is limited within the guard range may be prohibited so as not to set the guard range of the sub-air-fuel ratio correction amount Kr. In this case, the sub-air-fuel ratio control using the sub-air-fuel ratio correction amount Kr that is outside the guard range and the sub-air-fuel ratio control using the sub-air-fuel ratio correction amount Kr that is within the guard range are executed.

As shown in FIG. 7, the catalyst downstream-side sensor learned value ΔVrg is updated each time the predetermined duration is has elapsed. Therefore, even when abnormal air-fuel ratio variation among the cylinders has occurred, it takes a long time for the catalyst downstream-side sensor learned value ΔVrg to actually reach the malfunction determination value ΔVrgs. If the time that is required for the catalyst downstream-side sensor learned value ΔVrg to reach the malfunction determination value ΔVrgs is considerably long, the time required for the determination is also considerably long.

In order to solve this problem, in the sixth embodiment, when a determination as to whether abnormal air-fuel ratio variation among the cylinders has occurred is made, the update rate for the catalyst downstream-side sensor learned value ΔVrg is made higher than a prescribed rate. That is, the duration ts is made shorter than the prescribed value. Thus, it is possible to reduce the time required for the determination by updating the catalyst downstream-side sensor learned value ΔVrg more promptly. If the update rate for the catalyst downstream-side sensor learned value ΔVrg is increased, the update rate for the sub-air-fuel ratio correction amount Kr is increased in accordance with an increase in the update rate for the catalyst downstream-side sensor learned value ΔVrg.

In the sixth embodiment, the guard range is increased and the update rate is also increased. Alternatively, one of the guard range and the update rate may be increased. For example, when the malfunction determination value ΔVrgs in the prescribed state is set within the guard range, the guard range need not be increased.

Figure 23:
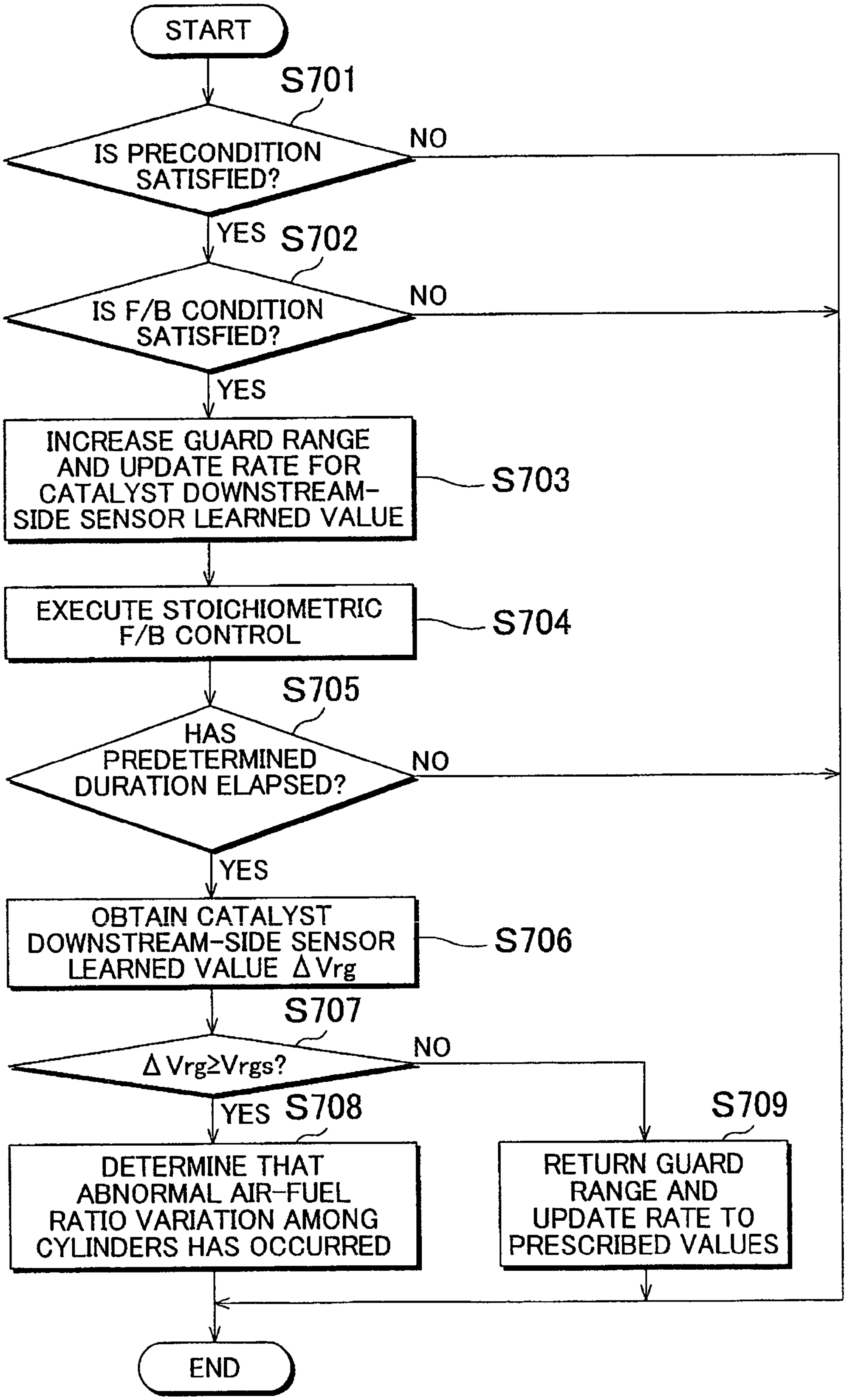
FIG. 23 is a flowchart showing a routine for determining whether abnormal air-fuel ratio variation among the cylinders has occurred according to a sixth embodiment of the invention.

FIG. 23 shows a routine for determining whether abnormal air-fuel ratio variation has occurred among the cylinders according to the sixth embodiment. The routine is periodically executed by the ECU 20 in predetermined calculation cycles.

In S701, it is determined whether a precondition for determining whether abnormal air-fuel ratio variation among the cylinders has occurred has been satisfied. The precondition is, for example, a condition that warming-up of the engine has been completed, or a condition that the temperature of the catalyst has reached an activation temperature.

If it is determined that the precondition has not been satisfied, the routine ends. On the other hand, if it is determined that the precondition has been satisfied, it is determined in S702 whether an execution condition for executing the main air-fuel ratio feedback control and the sub-air-fuel ratio feedback control has been satisfied. The condition is, for example, a condition that the catalyst upstream-side sensor 17 and the catalyst downstream-side sensor 18 are activated, more specifically, a condition that element impedances of the sensors, which are detected by the ECU 20, are smaller than a predetermined value corresponding to the minimum value of the temperature range in which the sensors are activated.

If it is determined that the execution condition has not been satisfied, the routine ends. On the other hand, if it is determined that the execution condition has been satisfied, S703 is executed. In S703, the guard range for the catalyst downstream-side sensor learned value ΔVrg is increased, and the update rate for the catalyst downstream-side sensor learned value ΔVrg is also increased. Namely, as described above, the upper limit guard value ΔVrgH of the catalyst downstream-side sensor learned value ΔVrg is changed to a value equal to the malfunction determination value ΔVrgs that is larger than the prescribed value. In addition, the update duration is for the catalyst downstream-side sensor learned value ΔVrg is made shorter than the prescribed value.

After the guard range and the update rate are increased as described above, the main air-fuel ratio feedback control and the sub-air-fuel ratio feedback control (stoichiometric feedback control) are executed in S704 using the stoichiometric air-fuel ratio as the target air-fuel ratio.

Next, it is determined in S705 whether a predetermined duration has elapsed since the stoichiometric feedback control is started, that is, whether the time, which is sufficiently long for the catalyst downstream-side sensor learned value ΔVrg and the sub-air-fuel ratio correction amount Kr to be changed to values corresponding to the air-fuel ratio variation, has elapsed. The update rate is increased in S703. Therefore, it is possible to set the predetermined duration to a relatively short duration. Thus, it is possible to reduce the time required to determine whether abnormal air-fuel ratio variation among the cylinders has occurred.

If it is determined that the predetermined duration has not elapsed, the routine ends. On the other hand, if it is determined that the predetermined duration has elapsed, a current value of the catalyst downstream-side sensor learned value ΔVrg is obtained.

Then, it is determined in S707 whether the obtained catalyst downstream-side sensor learned value ΔVrg is equal to or larger than the malfunction determination value ΔVrgs. Because the upper limit guard value ΔVrgH is changed to the malfunction determination value ΔVrgs in S703, the catalyst downstream-side sensor learned value ΔVrg is able to be increased to the malfunction determination value ΔVrgs.

When the catalyst downstream-side sensor learned value ΔVrg is equal to or larger than the malfunction determination value ΔVrgs (i.e., equal to the malfunction determination value ΔVrgs), it is determined in S708 that abnormal air-fuel ratio variation among the cylinders has occurred, and the routine ends. After it is determined that abnormal air-fuel ratio variation among the cylinders has occurred, it is preferable to activate an alarm device such as a check lamp to notify a user that abnormal air-fuel ratio variation among the cylinders has occurred.

On the other hand, if it is determined that the catalyst downstream-side sensor learned value ΔVrg is smaller than the malfunction determination value ΔVrgs, it is determined that abnormal air-fuel ratio variation among the cylinders has not occurred. Then, S709 is executed. In S709, the guard range and the update rate for the catalyst downstream-side sensor learned value ΔVrg are returned to the prescribed guard range and the prescribed update rate, and the routine ends.

In this case, whether abnormal air-fuel ratio variation among the cylinders has occurred is determined by comparing the catalyst downstream-side sensor learned value ΔVrg with the predetermined value. As a matter of course, whether abnormal air-fuel ratio variation among the cylinders has occurred may be determined by comparing the sub-air-fuel ratio correction amount Kr with the predetermined value.

Next, a determination as to whether abnormal air-fuel ratio variation among the cylinders has occurred according to a seventh embodiment will be described.

In the seventh embodiment, it is preliminarily determined whether there is a possibility that abnormal air-fuel ratio variation among the cylinders may have occurred before confirming whether abnormal air-fuel ratio variation among the cylinders has occurred in the above-described manner. Hereafter, a confirmation as to whether abnormal air-fuel ratio variation among the cylinders has occurred will be referred to as “final determination”, and a determination as to whether there is a possibility that abnormal air-fuel ratio variation among the cylinders may have occurred will be referred to as “preliminary determination”. If it is determined in the preliminary determination that there is a possibility that abnormal air-fuel ratio variation among the cylinders may have occurred, a final determination is made. Making a preliminary determination before a final determination makes it possible to make a double check. As a result, it is possible to enhance the accuracy and reliability of the determination.

Figures 24A, 24B:
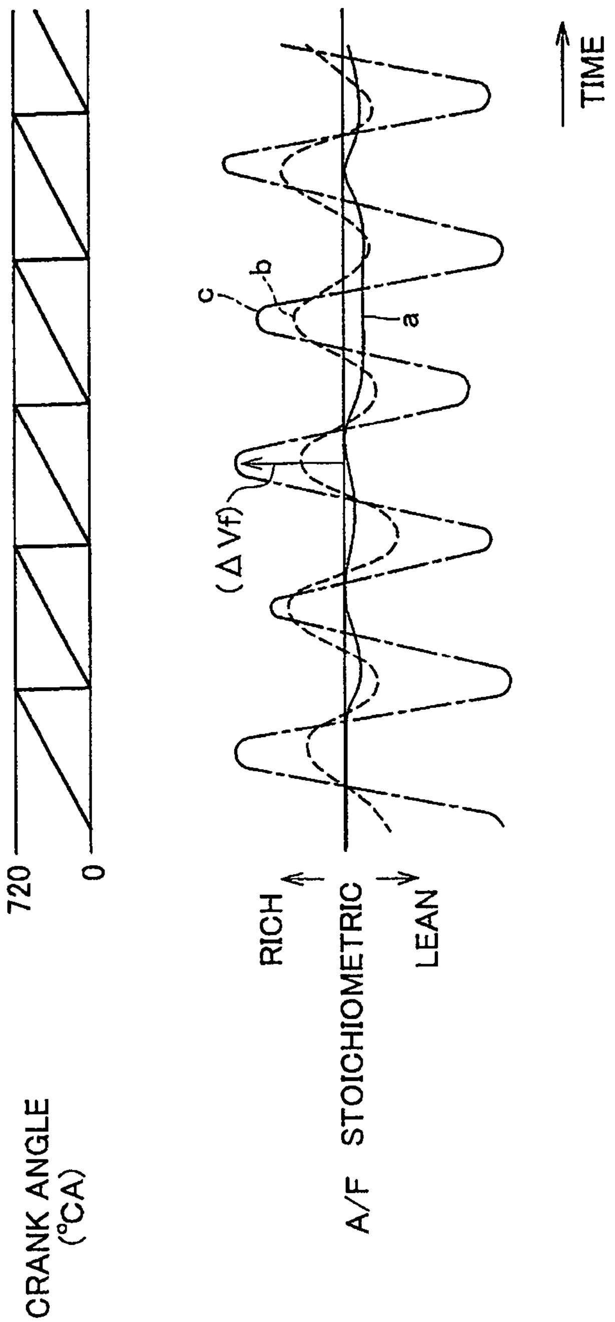
FIGS. 24A and 24B are graphs showing the fluctuations of the air-fuel ratio of the exhaust gas when abnormal air-fuel ratio variation among the cylinders has occurred.

A first example of the preliminary determination will be described below. As shown in FIGS. 24A and 24B, if abnormal air-fuel ratio variation among the cylinders has occurred, the volatility of the exhaust gas air-fuel ratio in one engine cycle (=720° CA) is increased. The air-fuel ratio diagram “a” in FIG. 24B indicates the detection value of the catalyst upstream-side air-fuel ratio when there is no air-fuel ratio variation among the cylinders. The air-fuel ratio diagram “b” in FIG. 24B indicates the detection value of the catalyst upstream-side air-fuel ratio when the air-fuel ratio in only one cylinder is richer than the stoichiometric air-fuel ratio by 20%. The air-fuel ratio diagram “c” in FIG. 24B indicates the detection value of the catalyst upstream-side air-fuel ratio when the air-fuel ratio in only one cylinder is richer than the stoichiometric air-fuel ratio by 50%. As shown in FIG. 24B, as the range of variation increases, the amplitude of the air-fuel ratio fluctuation increases and the frequency also increases.

Therefore, when the amplitude of the air-fuel ratio fluctuation or the frequency is larger than a predetermined value, it is determined that there is a possibility that abnormal air-fuel ratio variation among the cylinders may have occurred. In the seventh embodiment, the preliminary determination is made as described below using the amplitude. The difference between the catalyst upstream-side sensor output Vf and the stoichiometric-corresponding sensor output Vreff, more specifically, the absolute value of the catalyst upstream-side sensor output deviation ΔVf, which is the difference between the catalyst upstream-side sensor output Vf and the stoichiometric-corresponding sensor output Vreff, is integrated for a predetermined duration. When the integrated value exceeds a predetermined value, it is determined that there is a possibility that abnormal air-fuel ratio variation among the cylinders may have occurred. As the fluctuation of the exhaust gas air-fuel ratio increases, the absolute value of the catalyst upstream-side sensor output deviation ΔVf increases. Therefore, it is possible to determine whether there is a possibility that abnormal air-fuel ratio variation among the cylinders may have occurred.

Figure 25:
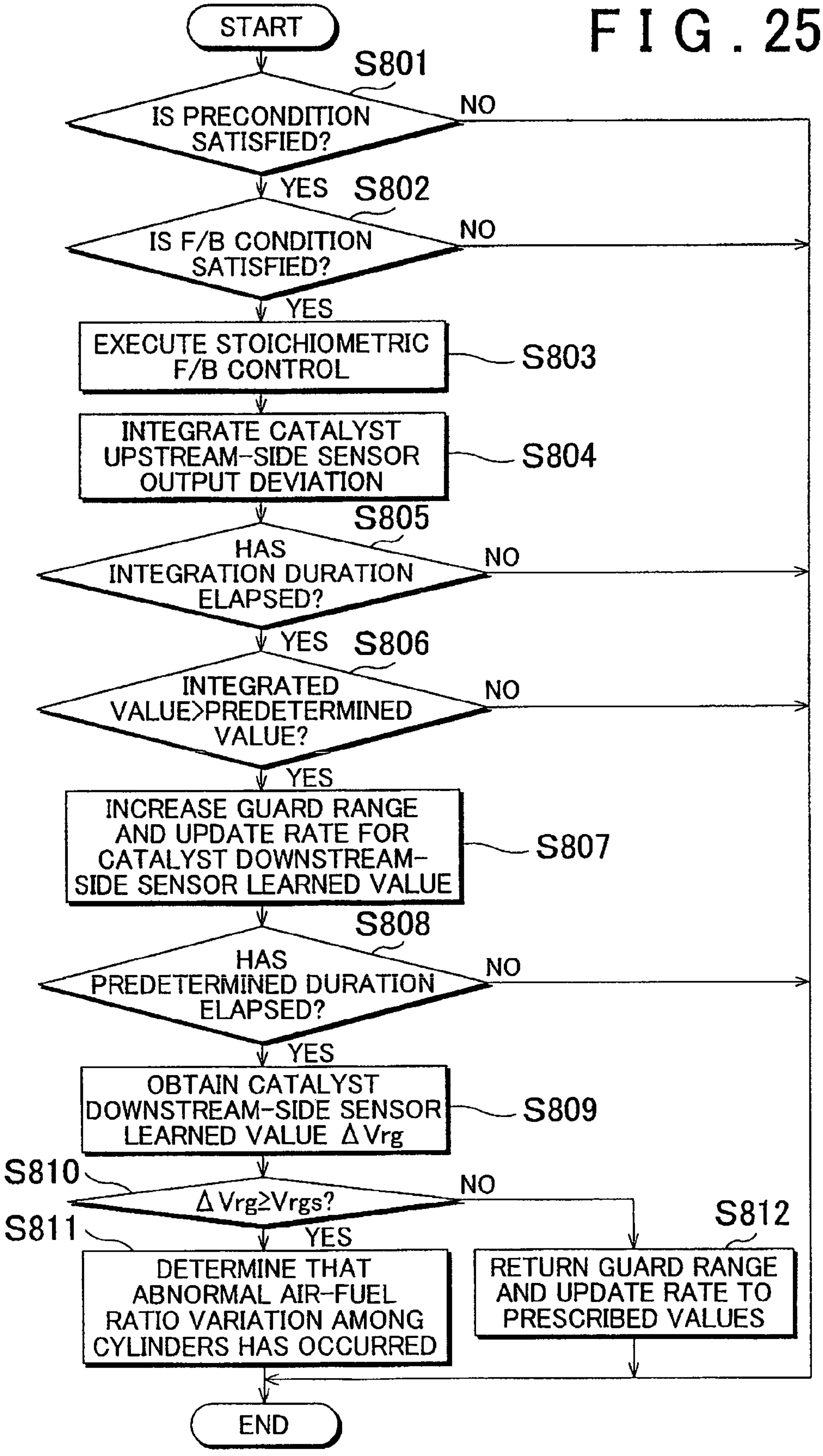
FIG. 25 is a flowchart showing a routine for determining whether abnormal air-fuel ratio variation among the cylinders has occurred, the routine including a first example of a preliminary determination.

FIG. 25 shows a routine for determining whether abnormal air-fuel ratio variation among the cylinders has occurred. The routine includes the first example of the preliminary determination. The routine is periodically executed by the ECU 20 in predetermined calculation cycles.

S801 and S802 are the same as S701 and S702, respectively. In S803 as well as in S704, stoichiometric feedback control is executed. However, at this stage, the guard range and the update rate for the catalyst downstream-side sensor learned value ΔVrg have not been increased.

In S804, the absolute value of the current catalyst upstream-side sensor output deviation ΔVf is calculated, and this value is added to the immediately preceding integrated value, whereby the catalyst upstream-side sensor output deviation ΔVf is integrated. In S805, it is determined whether a predetermined integration duration has elapsed since the integration is started (namely, since the stoichiometric feedback control is started in S803). If it is determined that the predetermined integration duration has not elapsed, the routine ends. On the other hand, if it is determined that the predetermined integration duration has elapsed, the final integrated value of the catalyst upstream-side sensor output deviation ΔVf is obtained in S806, and the final integrated value is compared with the predetermined preliminary malfunction determination value.

If it is determined that the final integrated value is equal to or smaller than the preliminary malfunction determination value, it is determined that there is no possibility that abnormal air-fuel ratio variation among the cylinders may have occurred, and the routine ends. On the other hand, if it is determined that the final integrated value exceeds the preliminary malfunction determination value, it is determined that there is a possibility that abnormal air-fuel ratio variation among the cylinders may have occurred, and S807 is executed.

In S807 to S812, the processes related to the above-described final determination are executed. That is, in S807 as well as in S703, the guard range of the catalyst downstream-side sensor learned value ΔVrg is increased, and the update rate for the catalyst downstream-side sensor learned value ΔVrg is also increased. Then, in this state, it is determined in S808 whether a predetermined duration (which is longer than the integration duration) has elapsed since the stoichiometric feedback control is started. If it is determined that the predetermined duration has not elapsed, the routine ends. On the other hand, if it is determined that the predetermined duration has elapsed, the processes that are the same as those in S706 to S709 are executed in S809 to S812. In S809 to S812, it is determined whether abnormal air-fuel ratio variation among the cylinders has occurred.

Next, a second example of the preliminary determination will be described. As shown in FIG. 9, if abnormal air-fuel ratio variation among the cylinders has occurred, the catalyst upstream-side sensor 17 continuously detects a catalyst upstream-side air-fuel ratio that is around the stoichiometric air-fuel ratio due to the main air-fuel ratio feedback control. However, the catalyst downstream-side sensor 18 continuously detects a catalyst downstream-side air-fuel ratio that is leaner than the stoichiometric air-fuel ratio due to the influence of hydrogen (i.e., the catalyst downstream-side sensor output is continuously a value on the lean side). In the second example of the preliminary determination, a determination is made using the above-described facts. If the catalyst downstream-side sensor 18 continuously detects the catalyst downstream-side air-fuel ratio that is leaner than the stoichiometric air-fuel ratio for a predetermined duration or longer although the catalyst upstream-side air-fuel ratio is controlled to the stoichiometric air-fuel ratio by the main air-fuel ratio feedback control, it is determined that there is a possibility that abnormal air-fuel ratio variation has among the cylinders may have occurred.

Figure 26:
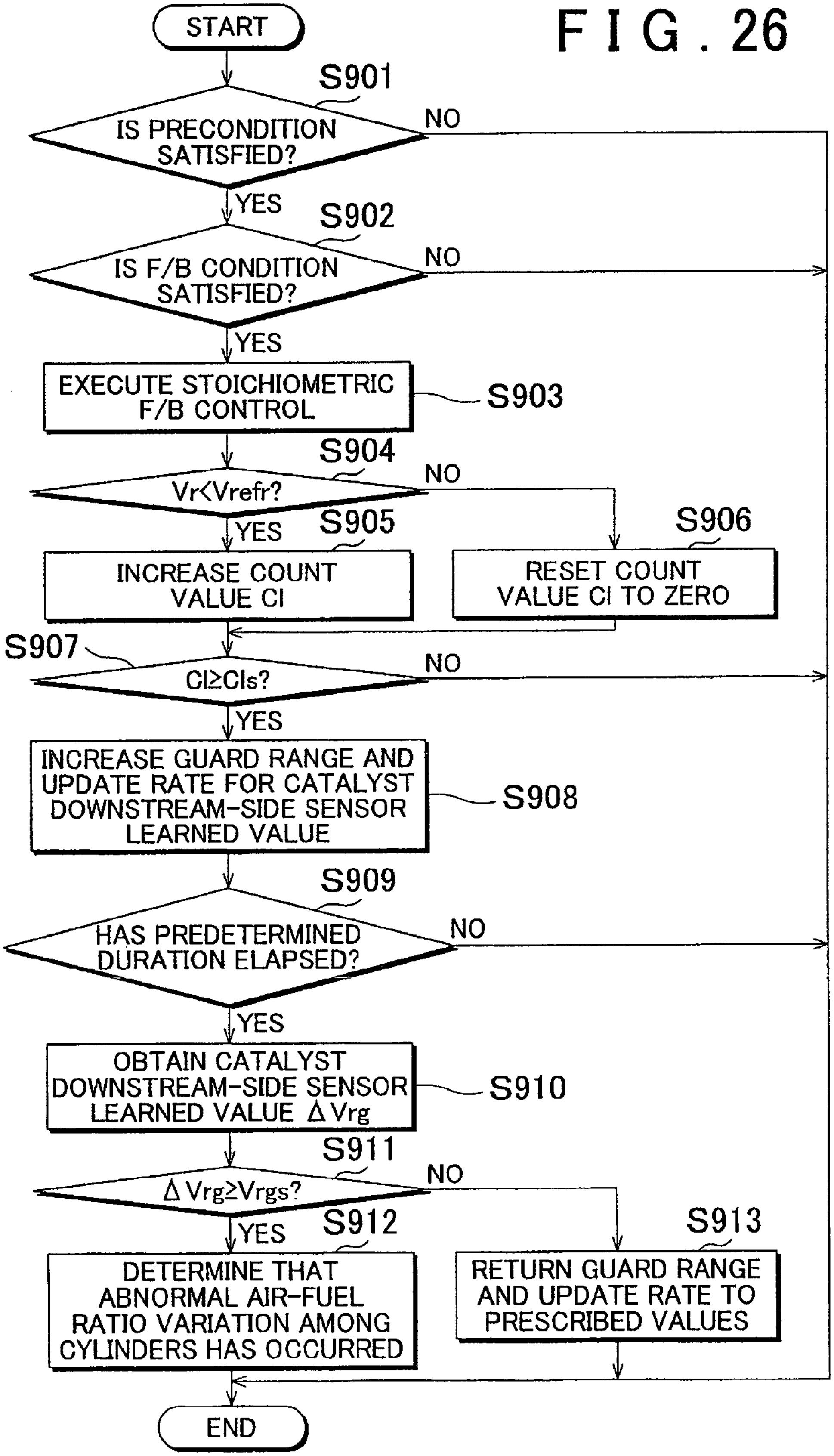
FIG. 26 is a flowchart showing a routine for determining whether abnormal air-fuel ratio variation among the cylinders has occurred, the routine including a second example of a preliminary determination.

FIG. 26 shows a routine for determining whether abnormal air-fuel ratio variation among the cylinders has occurred. The routine includes the second example of the preliminary determination. The routine is periodically executed by the ECU 20 in predetermined calculation cycles.

S901 and S902 are the same as S701 and S702, respectively. In S903 as well as in S704, the stoichiometric feedback control is executed. However, at this stage, the guard range and the update rate for the catalyst downstream-side sensor learned value ΔVrg have not been increased.

In S904, the output Vr from the catalyst downstream-side sensor 18 is obtained, and it is determined whether the obtained catalyst downstream-side sensor output Vr is smaller than the stoichiometric-corresponding sensor output Vrefr, that is, whether the catalyst downstream-side air-fuel ratio detected by the catalyst downstream-side sensor 18 is leaner than the stoichiometric air-fuel ratio. If it is determined that the catalyst downstream-side sensor output Vr is smaller than the stoichiometric-corresponding sensor output Vrefr, in S905, the count value C1 indicated by the lean continuation counter provided in the ECU 20 is increased, and S907 is executed. The lean continuation counter is used to count the duration during which the detection value of the catalyst downstream-side air-fuel ratio is leaner than the stoichiometric air-fuel ratio. On the other hand, if it is determined that the catalyst downstream-side sensor output Vr is equal to or larger than the stoichiometric-corresponding sensor output Vrefr, the lean continuation counter is reset to 0 in S906, and S907 is executed.

In S907, it is determined whether the count value C1 indicated by the lean continuation counter is equal to or larger than the predetermined value C1$s$, that is, whether the duration during which the detection value of the catalyst downstream-side air-fuel ratio is leaner than the stoichiometric air-fuel ratio is equal to or longer than the predetermined duration.

If it is determined that the count value C1 is not equal to or larger than the predetermined value C1$s$, it is determined that there is no possibility that abnormal air-fuel ratio variation among the cylinder may have occurred, and the routine ends. On the other hand, if it is determined that the count value C1 is equal to or larger than the predetermined value C1$s$, it is determined that there is a possibility that abnormal air-fuel ratio variation among the cylinders may have occurred, and S908 is executed.

In S908 to S913, the processes that are the same as those in S807 to S812 are executed. The processes in S908 to S913 are related to the final determination.

Next, a third example of the preliminary determination will be described. In the third example, a three-way catalyst that has oxygen storage function is used as the catalyst 11. In this case, when the air-fuel ratio of the exhaust gas that flows into the catalyst (i.e., catalyst upstream-side air-fuel ratio) is leaner than the stoichiometric air-fuel ratio, the catalyst stores oxygen in the exhaust gas. On the other hand, when the air-fuel ratio of the exhaust gas is richer than the stoichiometric air-fuel ratio, the catalyst releases the stored oxygen. The so-called Cmax method is known as a method for determining whether such three-way catalyst has deteriorated. The Cmax method is executed using the fact that the oxygen storage capacity of the catalyst decreases if the catalyst deteriorates. According to the Cmax method, the amount of oxygen that can be stored in (or released from) the catalyst (i.e., the oxygen storage capacity OSC) in the current state is measured, and whether the catalyst has deteriorated is determined by comparing the measured value with a predetermined value. In the determination as to whether the catalyst has deteriorated, active air-fuel ratio control for forcibly changing the air-fuel ratio between a rich air-fuel ratio and a lean air-fuel ratio is executed, the amount of oxygen stored in the catalyst and the amount of oxygen released from the catalyst are measured multiple times during the active air-fuel ratio control, and the average value is used as the final oxygen storage capacity OSC and compared with a predetermined value.

Figures 27A, 27B, 27C, 27D:
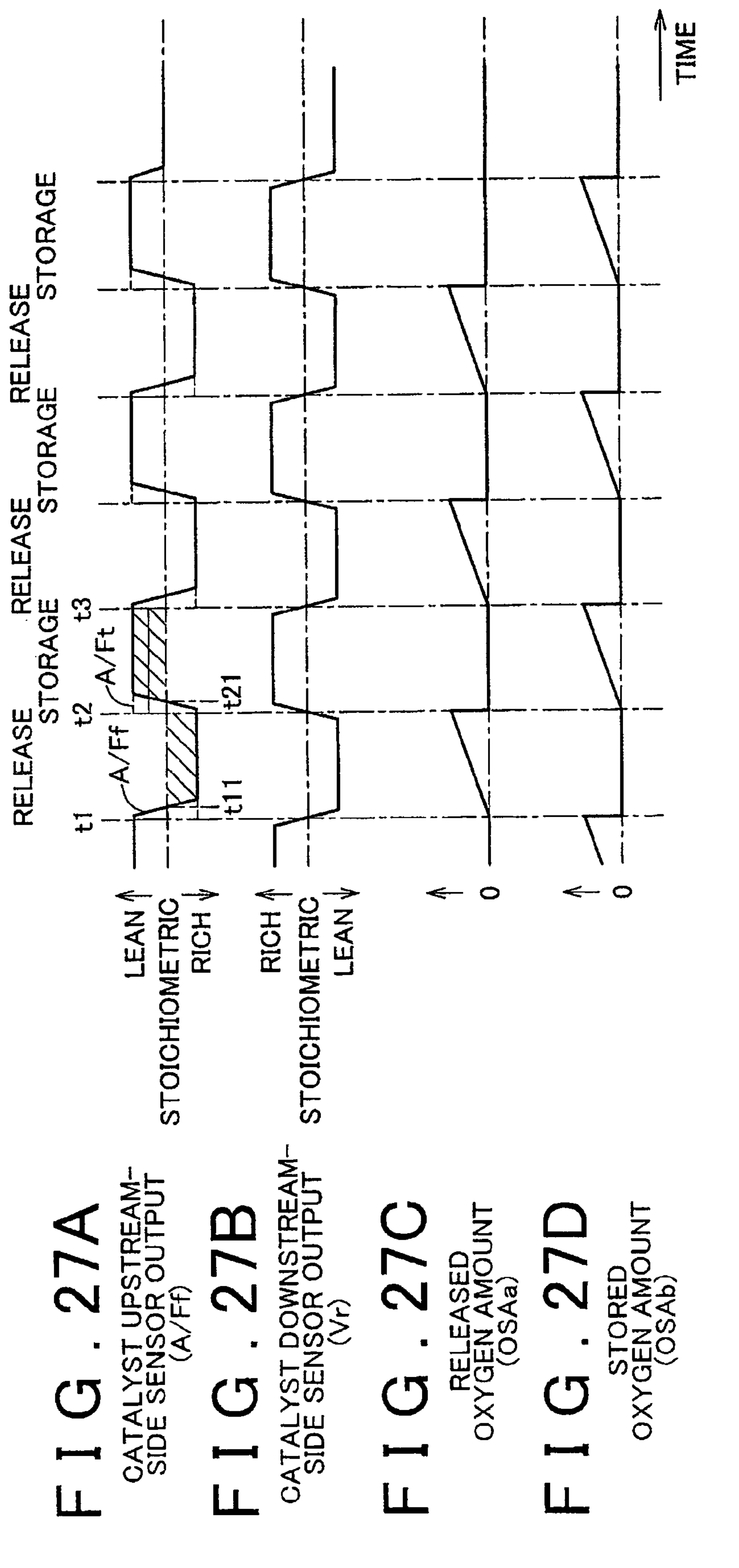
FIGS. 27A to 27D are time-charts illustrating a method for measuring the amount of stored oxygen and the amount of released oxygen.

Hereafter, measurement of the amount of oxygen stored in the catalyst and the amount of oxygen released from the catalyst will be described with reference to FIGS. 27A to 27D. FIG. 27A indicates a target air-fuel ratio A/F (indicated by a dashed line) and a catalyst upstream-side air-fuel ratio A/Ff (indicated by a solid line) that is detected by the catalyst upstream-side sensor 17. FIG. 27B indicates the catalyst downstream-side sensor output Vr. FIG. 27C indicates the integrated value of the amount of oxygen released from the catalyst, that is, the released oxygen amount OSAa. FIG. 27D indicates the integrated value of the amount of oxygen stored in the catalyst, that is, the stored oxygen amount OSAb.

As shown in FIGS. 27A to 27D, the air-fuel ratio of the exhaust gas that flows into the catalyst is alternately changed between a lean air-fuel ratio and a rich air-fuel ratio forcibly at predetermined timing by executing the active air-fuel ratio control. For example, before time t1, the target air-fuel ratio A/Ft is set to a value leaner than the stoichiometric air-fuel ratio (e.g. 15.1), and lean gas flows into the catalyst 11. At this time, the catalyst 11 continuously stores oxygen, and reduces lean component (NOx) in the exhaust gas to remove it. However, when the catalyst 11 is saturated with oxygen, that is, the catalyst 11 has stored oxygen to the fullest extent, the catalyst 11 is no longer able to absorb oxygen. Then, the lean gas passes through the catalyst 11 and flows toward the downstream-side of the catalyst 11. In this state, the output from the catalyst downstream-side sensor 18 changes to a lean value, and the output from the catalyst downstream-side sensor 18 reaches the stoichiometric-corresponding sensor output Vrefr (time t1). At this time, the target air-fuel ratio A/Ft is changed to a value richer than the stoichiometric air-fuel ratio (e.g. 14.1).

Then, rich gas flows into the catalyst 11. At this time, the catalyst 11 continuously releases the stored oxygen, and oxidizes the rich components (HC, CO) in the exhaust gas to remove them. When the stored oxygen is entirely released from the catalyst 11, the catalyst is no longer able to release the oxygen. Then, the rich gas flows through the catalyst 11 and flows toward the downstream-side of the catalyst 11. In this state, the catalyst downstream-side air-fuel ratio is changed to a value richer than the stoichiometric air-fuel ratio, and the output from the catalyst downstream-side sensor 18 reaches the stoichiometric-corresponding sensor output Vrefr (time t2). At this time, the target air-fuel ratio A/Ft is changed to a lean air-fuel ratio. Thus, the air-fuel ratio is repeatedly changed between a rich air-fuel ratio and a lean air-fuel ratio.

As shown in FIG. 27C, in the release cycle from time t1 to time t2, an amount OSAa of oxygen, which is released during a considerably short predetermined cycle, is integrated. More specifically, an amount dOSA (dOSAa) of oxygen released during one calculation cycle is calculated by the following equation (1) from time t11, at which the output from the catalyst upstream-side sensor 17 reaches the stoichiometric-corresponding sensor output, to time t2, at which the output from the catalyst downstream-side sensor 18 is changed to a rich value (reaches Vrefr), and the released oxygen amount dOSA (dOSAa) is integrated. The final integrated value thus obtained is used as a measured value of the released oxygen amount OSAa corresponding to the amount of oxygen stored in the catalyst.

$$dOSA=\Delta A/F\times Q\times K=|A/Fs-A/Ffr|\times Q\times K \qquad (1)$$

Q is the fuel injection amount. An amount of excess air or a shortfall of the air can be calculated by multiplying an air-fuel ratio difference ΔA/F by the fuel injection amount Q. K is the ratio of oxygen contained in the air to the air (approximately 0.23).

Similarly, in the storage cycle from time t2 to time t3, as shown in FIG. 27D, an amount dOSA (dOSAb) of oxygen, which is stored during one calculation cycle, is calculated according to the above equation 1), and the stored oxygen amount dOSA (dOSAb) is integrated from time from time t21, at which the output from the catalyst upstream-side sensor 17 reaches the stoichiometric-corresponding sensor output, to time t3, at which the output from the catalyst downstream-side sensor 18 is changed to a rich value (reaches Vrefr). The final integrated value thus obtained is used as a measured value of the stored oxygen amount OSAb corresponding to the amount of oxygen stored in the catalyst. By repeating the release cycle and the storage cycle in this way, the released oxygen amount OSAa and the stored oxygen amount OASb are measured and obtained multiple times.

In principle, the amount of oxygen that can be stored in the catalyst is equal to the amount of oxygen that can be released from the catalyst. Therefore, the released oxygen amount OSAa is supposed to be equal to the stored oxygen amount OSAb. That is, the released oxygen amount OSAa and the stored oxygen amount OSAb are in a symmetrical relationship. However, if abnormal air-fuel ratio variation among the cylinders occurs, the symmetrical relationship is lost, and the released oxygen amount OSAa and the stored oxygen amount OSAb are asymmetric. That is, the output from the catalyst upstream-side sensor 17 is richer than the actual value due to the influence of hydrogen. Therefore, the air-fuel ratio of the exhaust gas that is actually supplied to the catalyst is slightly leaner than the apparent air-fuel ratio detected by the catalyst upstream-side sensor 17. Therefore, the measured value of the released oxygen amount OSAa and the measured value of the stored oxygen amount OSAb are not equal to each other. The released oxygen amount OSAa is larger than the stored oxygen amount OSAb.

Therefore, the preliminary determination is made using this phenomenon. That is, the released oxygen amount OSAa and the stored oxygen amount OSAb are measured, and the ratio R between the measured value of the released oxygen amount OSAa and the measured value of the stored oxygen amount OSAb is calculated. If the ratio R is larger than a predetermined value, it is determined that there is a possibility that abnormal air-fuel ratio variation among the cylinders may have occurred. Alternatively, when the difference between the measured values is larger than a predetermined value, it may be determined that there is a possibility that abnormal air-fuel ratio variation among the cylinders may have occurred.

Figure 28:
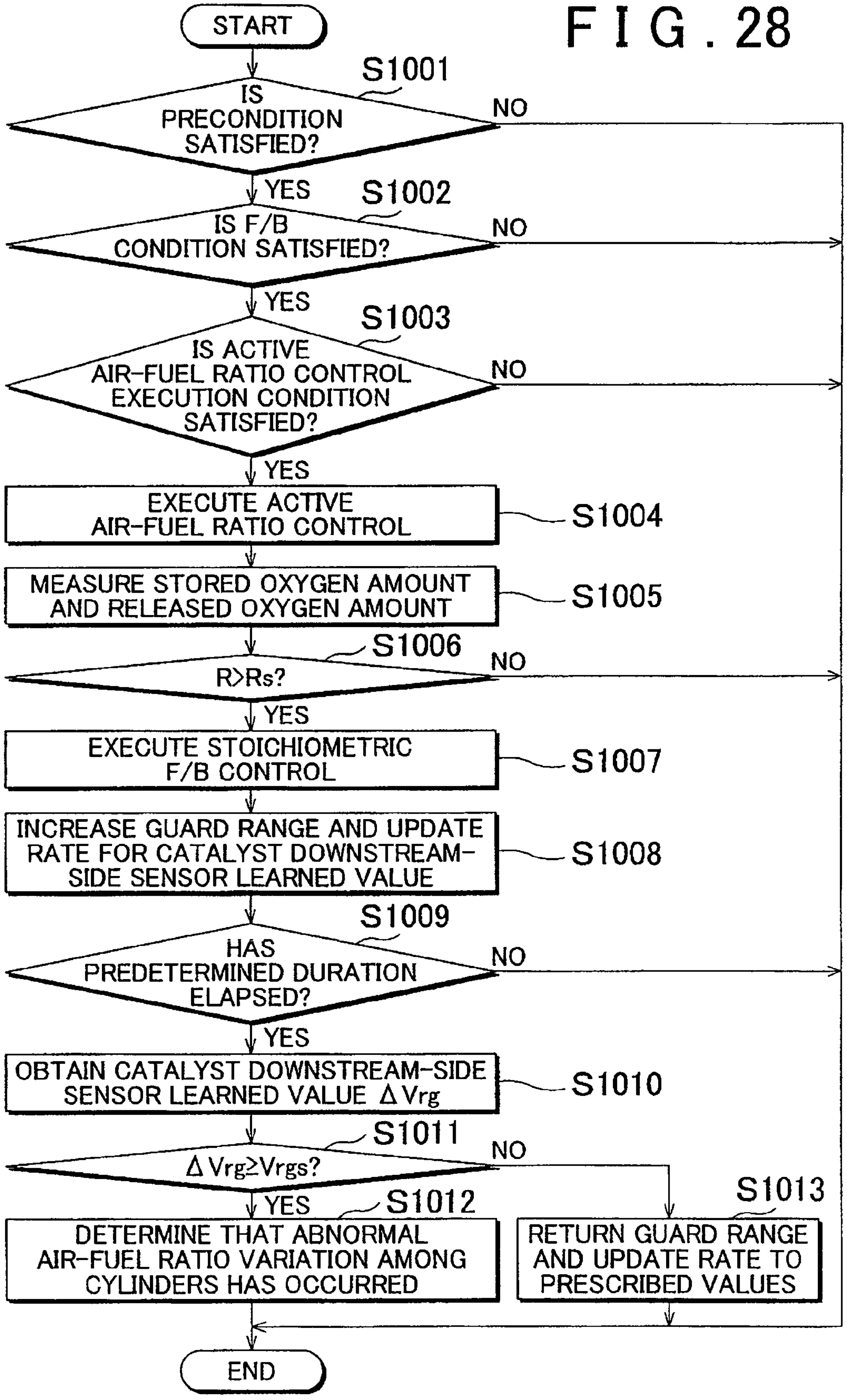
FIG. 28 is a flowchart showing a routine for determining whether abnormal air-fuel ratio variation among the cylinders has occurred, the routine including a third example of a preliminary determination.

FIG. 28 shows a routine for determining whether abnormal air-fuel ratio variation has occurred. The routine includes the third example of the preliminary determination. The routine is periodically executed by the ECU 20 in predetermined calculation cycles.

S1001 and S1002 are the same as S701 and S702, respectively. In S1003, it is determined whether a predetermined condition appropriate for executing the active air-fuel ratio control has been satisfied. When the engine is in the steady operating state, for example, when the volatility of the detection value of the intake air amount Ga and the volatility of the detection value of the engine speed Ne are within predetermined ranges, it is determined that the condition has been satisfied. If it is determined that the condition has not been satisfied, the routine ends. On the other hand, if it is determined that the condition has been satisfied, S1004 is executed.

In S1004, the active air-fuel ratio control is executed. In S1005, the released oxygen amount OSAa and the stored oxygen amount OSAb are measured, and the measured values are obtained multiple times. Next, in S1006, the average value OSAaAV of the multiple measured values of the released oxygen amount OSAa and the average value OSAbAV of the multiple measured values of the stored oxygen amount OSAb are calculated, and the ratio R between the average value OSAaAV and the average value OSAbAV is calculated. Then, the ratio R and the predetermined value Rs are compared with each other. The predetermined value Rs is set to a value larger than 1.

When the ratio R is equal to or smaller than the predetermined value Rs, it is determined that there is no possibility that abnormal air-fuel ratio variation among the cylinders may have occurred, and the routine ends. On the other hand, if the ratio R is larger than the predetermined value Rs, it is determined that there is a possibility that abnormal air-fuel ratio variation among the cylinders may have occurred, and S1007 is executed.

In S1007 and the following steps, the processes related to the final determination are executed. In S1007 as well as in S803, the stoichiometric feedback control is executed. In S1008 as well as in S807, the guard range and the update rate for the catalyst downstream-side sensor learned value ΔVrg are increased. In S1009 to S1013, the processes that are the same as those in S808 to S812 are executed.

Note that, at least two of the first to third examples of the preliminary determination may be combined with each other.

The example embodiments of the invention have been described above. However, the invention may be implemented in various other embodiments. For example, the internal combustion engine described above is an intake port (intake passage) injection type. However, the invention may be applicable to a direct injection engine and a dual injection engine in which both types of injection may be performed. In the embodiments described above, a wide range air-fuel ratio sensor is arranged upstream of the catalyst, and an $O_2$ sensor is arranged downstream of the catalyst. Alternatively, a wide range air-fuel ratio sensor may be arranged downstream of the catalyst, or an $O_2$ sensor may be arranged upstream of the catalyst. Sensors that detect an air-fuel ratio of the exhaust gas, for example, a wide-range air-fuel ratio sensor and an $O_2$ sensor are referred to as air-fuel ratio sensors in the invention. In the embodiments described above, a target air-fuel ratio that is used in each of the main air-fuel ratio control and the sub-air-fuel ratio control is set to the stoichiometric air-fuel ratio. However, a target air-fuel ratio used in the main air-fuel ratio control may be different from a target air-fuel ratio used in the sub-air-fuel ratio control. For example, when the engine is started or when the engine is warmed up, each of the target air-fuel ratio used in the main air-fuel ratio control and the target air-fuel ratio used in the sub-air-fuel ratio control may be set to a value slightly richer than the stoichiometric air-fuel ratio. The invention may be applicable in this case as well.

In the embodiments described above, the air-fuel ratio in one cylinder (cylinder #1) of the four cylinder engine is richer than the air-fuel ratio in the other three cylinders (cylinders #2 to #4). However, the number of cylinders of which the air-fuel ratio is richer than the other cylinders is not limited to a certain number. The invention may be applicable in a case in which the air-fuel ratios in some cylinders (for example, cylinders #1 and #2) are richer than the air-fuel ratio in the other cylinders (for example, cylinders #3 and #4). When the air-fuel ratios in the cylinders #1 to #3 are richer than the air-fuel ratio in the cylinder #4, the air-fuel ratio in the cylinder #4 is leaner than the air-fuel ratios in the cylinders #1 to #3. The invention may be applicable in this case as well.

The embodiments of the invention that have been described in the specification are to be considered in all respects as illustrative and not restrictive. The technical scope of the invention is defined by claims, and all changes which come within the meaning and range of equivalency of the claims are therefore intended to be embraced therein.

The invention claimed is:

1. An apparatus for detecting abnormal air-fuel ratio variation among cylinders of a multi-cylinder internal combustion engine, comprising:

a catalyst element that is provided in an exhaust passage of the multi-cylinder internal combustion engine, and that oxidizes at least hydrogen contained in exhaust gas to remove the hydrogen;

a first air-fuel ratio sensor that detects a first exhaust gas air-fuel ratio which is an air-fuel ratio of exhaust gas that has not passed through the catalyst element;

a second air-fuel ratio sensor that detects a second exhaust gas air-fuel ratio which is an air-fuel ratio of exhaust gas that has passed through the catalyst element; and an abnormality determination unit that determines whether abnormal air-fuel ratio variation among the cylinders has occurred based on an amount by which a detection value of the second exhaust gas air-fuel ratio is leaner than a detection value of the first exhaust gas air-fuel ratio.

2. The apparatus according to claim 1, wherein:

the first air-fuel ratio sensor is arranged in the exhaust passage at a position upstream of the catalyst element;

the second air-fuel ratio sensor is arranged in the exhaust passage at a position downstream of the catalyst element; and the apparatus further comprises an air-fuel ratio control unit that executes air-fuel ratio control that includes main air-fuel ratio control for bringing the detection value of the first exhaust gas air-fuel ratio to a predetermined first target air-fuel ratio and sub-air-fuel ratio control for bringing the detection value of the second exhaust gas air-fuel ratio to a predetermined second target air-fuel ratio.

3. The apparatus according to claim 2, wherein the abnormality determination unit determines that abnormal air-fuel ratio variation among the cylinders has occurred when the detection value of the second exhaust gas air-fuel ratio is continuously leaner than the first target air-fuel ratio for a predetermined duration or longer during the air-fuel ratio control executed by the air-fuel ratio control unit.

4. The apparatus according to claim 2, wherein:

the air-fuel ratio control unit calculates a control amount that is used in the sub-air-fuel ratio control based on an output from the second air-fuel ratio sensor; and the abnormality determination unit determines that abnormal air-fuel ratio variation among the cylinders has occurred, when the control amount is a value that is equal to or larger than a predetermined value based on which the second exhaust gas air-fuel ratio is corrected to a richer value during the air-fuel ratio control executed by the air-fuel ratio control unit.

5. The apparatus according to claim 2, wherein:

the air-fuel ratio control unit forcibly sets the first target air-fuel ratio that is used in the main air-fuel ratio control to a value that is richer than a reference value; and the abnormality determination unit determines that abnormal air-fuel ratio variation among the cylinders has occurred when the detection value of the second exhaust gas air-fuel ratio is continuously leaner than the second target air-fuel ratio during the air-fuel ratio control executed by the air-fuel ratio control unit.

6. The apparatus according to claim 1, wherein:

the catalyst element is arranged in a sensor element of the second air-fuel ratio sensor and the abnormality determination unit determines that abnormal air-fuel ratio variation among the cylinders has occurred when the detection value of the second exhaust gas air-fuel ratio is leaner than the detection value of the first exhaust gas air-fuel ratio by an amount that is equal to or larger than a predetermined value.

7. The apparatus according to claim 2, wherein each of the first target air-fuel ratio and the second target air-fuel ratio is set to a stoichiometric air-fuel ratio.

8. The apparatus according to claim 2, wherein:

the air-fuel ratio control unit updates a control amount that is used in the sub-air-fuel ratio control at a predetermined update rate based on an output from the second air-fuel ratio sensor;

the abnormality determination unit determines that abnormal air-fuel ratio variation among the cylinders has occurred when the control amount reaches a predetermined abnormality determination value based on which the second exhaust gas air-fuel ratio is corrected to a richer value; and when the air-fuel ratio control unit executes the sub-air-fuel ratio control using the control amount that is within a predetermined guard range and the abnormality determination unit determines whether abnormal air-fuel ratio variation among the cylinders has occurred, the air-fuel ratio control unit executes control for increasing the update rate for the control amount.

9. The apparatus according to claim 2, wherein:

the air-fuel ratio control unit updates a control amount that is used in the sub-air-fuel ratio control at a predetermined update rate based on an output from the second air-fuel ratio sensor;

the abnormality determination unit determines that abnormal air-fuel ratio variation among the cylinders has occurred when the control amount reaches a predetermined abnormality determination value based on which the second exhaust gas air-fuel ratio is corrected to a richer value; and when the air-fuel ratio control unit executes the sub-air-fuel ratio control using the control amount that is within a predetermined guard range and the abnormality determination unit determines whether abnormal air-fuel ratio variation among the cylinders has occurred, the air-fuel ratio control unit executes control for increasing the guard range so that the guard range includes the abnormality determination value.

10. The apparatus according to claim 2, wherein:

the air-fuel ratio control unit updates a control amount that is used in the sub-air-fuel ratio control at a predetermined update rate based on an output from the second air-fuel ratio sensor;

the abnormality determination unit determines that abnormal air-fuel ratio variation among the cylinders has occurred when the control amount reaches a predetermined abnormality determination value based on which the second exhaust gas air-fuel ratio is corrected to a richer value; and when the air-fuel ratio control unit executes the sub-air-fuel ratio control using the control amount that is within a predetermined guard range and the abnormality determination unit determines whether abnormal air-fuel ratio variation among the cylinders has occurred, the air-fuel ratio control unit executes both control for increasing the guard range so that the guard range includes the abnormality determination value and control for increasing the update rate for the control amount.

11. The apparatus according to claim 2, wherein:

the air-fuel ratio control unit updates a control amount that is used in the sub-air-fuel ratio control at a predetermined update rate based on an output from the second air-fuel ratio sensor;

the abnormality determination unit determines that abnormal air-fuel ratio variation among the cylinders has occurred when the control amount reaches a predetermined abnormality determination value based on which the second exhaust gas air-fuel ratio is corrected to a richer value;

the air-fuel ratio control unit executes the sub-air-fuel ratio control using the control amount that is within a predetermined guard range; and when the abnormality determination unit determines whether abnormal air-fuel ratio variation among the cylinders has occurred, the air-fuel ratio control unit permits execution of the sub-air-fuel ratio control even if the control amount is outside the predetermined guard range.

12. The apparatus according to claim 8, further comprising:

a preliminary determination unit that preliminarily determines whether there is a possibility that abnormal air-fuel ratio variation among the cylinders has occurred before the abnormality determination unit confirms whether abnormal air-fuel ratio variation among the cylinders has occurred, wherein the abnormality determination unit confirms whether abnormal air-fuel ratio variation among the cylinders has occurred after the preliminary determination unit determines that there is a possibility that air-fuel ratio variation among the cylinders has occurred.

13. The apparatus according to claim 9, further comprising:

a preliminary determination unit that preliminarily determines whether there is a possibility that abnormal air-fuel ratio variation among the cylinders has occurred before the abnormality determination unit confirms whether abnormal air-fuel ratio variation among the cylinders has occurred, wherein the abnormality determination unit confirms whether abnormal air-fuel ratio variation among the cylinders has occurred after the preliminary determination unit determines that there is a possibility that air-fuel ratio variation among the cylinders has occurred.

14. The apparatus according to claim 10, further comprising:

a preliminary determination unit that preliminarily determines whether there is a possibility that abnormal air-fuel ratio variation among the cylinders has occurred before the abnormality determination unit confirms whether abnormal air-fuel ratio variation among the cylinders has occurred, wherein the abnormality determination unit confirms whether abnormal air-fuel ratio variation among the cylinders has occurred after the preliminary determination unit determines that there is a possibility that air-fuel ratio variation among the cylinders has occurred.

15. The apparatus according to claim 11, further comprising:

a preliminary determination unit that preliminarily determines whether there is a possibility that abnormal air-fuel ratio variation among the cylinders has occurred before the abnormality determination unit confirms whether abnormal air-fuel ratio variation among the cylinders has occurred, wherein the abnormality determination unit confirms whether abnormal air-fuel ratio variation among the cylinders has occurred after the preliminary determination unit determines that there is a possibility that air-fuel ratio variation among the cylinders has occurred.

16. The apparatus according to claim 12, wherein the preliminary determination unit determines that there is a possibility that abnormal air-fuel ratio variation among the cylinders has occurred, when at least one of a) a condition that an integrated value which is obtained by integrating a difference between an output from the first air-fuel ratio sensor and a sensor output corresponding to the first target air-fuel ratio for a predetermined duration, exceeds a predetermined value, b) a condition that the second exhaust gas air-fuel ratio that is detected by the second air-fuel ratio sensor is continuously leaner than the first target air-fuel ratio for a predetermined duration or longer, and c) a condition that a ratio or a difference between an amount of oxygen stored in the catalyst element and an amount of oxygen released from the catalyst element is larger than a predetermined value is satisfied.

17. The apparatus according to claim 13, wherein the preliminary determination unit determines that there is a possibility that abnormal air-fuel ratio variation among the cylinders has occurred, when at least one of a) a condition that an integrated value which is obtained by integrating a difference between an output from the first air-fuel ratio sensor and a sensor output corresponding to the first target air-fuel ratio for a predetermined duration, exceeds a predetermined value, b)

a condition that the second exhaust gas air-fuel ratio that is detected by the second air-fuel ratio sensor is continuously leaner than the first target air-fuel ratio for a predetermined duration or longer, and c) a condition that a ratio or a difference between an amount of oxygen stored in the catalyst element and an amount of oxygen released from the catalyst element is larger than a predetermined value is satisfied.

18. The apparatus according to claim 14, wherein the preliminary determination unit determines that there is a possibility that abnormal air-fuel ratio variation among the cylinders has occurred, when at least one of a) a condition that an integrated value which is obtained by integrating a difference between an output from the first air-fuel ratio sensor and a sensor output corresponding to the first target air-fuel ratio for a predetermined duration, exceeds a predetermined value, b) a condition that the second exhaust gas air-fuel ratio that is detected by the second air-fuel ratio sensor is continuously leaner than the first target air-fuel ratio for a predetermined duration or longer, and c) a condition that a ratio or a difference between an amount of oxygen stored in the catalyst element and an amount of oxygen released from the catalyst element is larger than a predetermined value is satisfied.

19. The apparatus according to claim 15, wherein the preliminary determination unit determines that there is a possibility that abnormal air-fuel ratio variation among the cylinders has occurred, when at least one of a) a condition that an integrated value which is obtained by integrating a difference between an output from the first air-fuel ratio sensor and a sensor output corresponding to the first target air-fuel ratio for a predetermined duration, exceeds a predetermined value, b) a condition that the second exhaust gas air-fuel ratio that is detected by the second air-fuel ratio sensor is continuously leaner than the first target air-fuel ratio for a predetermined duration or longer, and c) a condition that a ratio or a difference between an amount of oxygen stored in the catalyst element and an amount of oxygen released from the catalyst element is larger than a predetermined value is satisfied.

20. A method for detecting abnormal air-fuel ratio variation among cylinders of a multi-cylinder internal combustion engine in which a catalyst element, which oxidizes at least hydrogen contained in exhaust gas to remove the hydrogen, is provided in an exhaust passage, comprising:

detecting with a first sensor, a first exhaust gas air-fuel ratio which is an air-fuel ratio of exhaust gas that has not passed through the catalyst element;

detecting with a second sensor, a second exhaust gas air-fuel ratio which is an air-fuel ratio of exhaust gas that has passed through the catalyst element;

comparing with a processor, a detection value of the first exhaust gas air-fuel ratio with a detection value of the second exhaust gas air-fuel ratio; and determining with the processor, whether abnormal air-fuel ratio variation among the cylinders has occurred based on an amount by which the detection value of the second exhaust gas air-fuel ratio is leaner than the detection value of the first exhaust gas air-fuel ratio.

21. The method according to claim 20, wherein:

a first air-fuel ratio sensor that detects the first exhaust gas air-fuel ratio is arranged in the exhaust passage at a position upstream of the catalyst element;

a second air-fuel ratio sensor that detects the second exhaust gas air-fuel ratio is arranged in the exhaust passage at a position downstream of the catalyst element; and the method further comprises executing air-fuel ratio control that includes main air-fuel ratio control for bringing the detection value of the first exhaust gas air-fuel ratio to a predetermined first target air-fuel ratio and sub-air-fuel ratio control for bringing the detection value of the second exhaust gas air-fuel ratio to a predetermined second target air-fuel ratio.

22. The method according to claim 21, wherein it is determined that abnormal air-fuel ratio variation among the cylinders has occurred when the detection value of the second exhaust gas air-fuel ratio is continuously leaner than the first target air-fuel ratio for a predetermined duration or longer during the air-fuel ratio control.

23. The method according to claim 21, wherein:

the air-fuel ratio control includes calculating a control amount that is used in the sub-air-fuel ratio control; and it is determined that abnormal air-fuel ratio variation among the cylinders has occurred when the control amount is a value that is equal to or larger than a predetermined value based on which the second exhaust gas air-fuel ratio is corrected to a richer value during the air-fuel ratio control.

24. The method according to claim 21, wherein:

the air-fuel ratio control includes forcibly setting the first target air-fuel ratio that is used in the main air-fuel ratio control to a value that is richer than a reference value; and it is determined that abnormal air-fuel ratio variation among the cylinders has occurred when the detection value of the second exhaust gas air-fuel ratio is continuously leaner than the second target air-fuel ratio during the air-fuel ratio control.

25. The method according to claim 20, wherein:

the first exhaust gas air-fuel ratio is detected by a first air-fuel ratio sensor;

the second exhaust gas air-fuel ratio is detected by a second air-fuel ratio sensor;

the catalyst element is arranged in a sensor element of the second air-fuel ratio sensor; and it is determined that abnormal air-fuel ratio variation among the cylinders has occurred when the detection value of the second exhaust gas air-fuel ratio is leaner than the detection value of the first exhaust gas air-fuel ratio by an amount that is equal to or larger than a predetermined value.

26. The method according to claim 21, wherein each of the first target air-fuel ratio and the second target air-fuel ratio is set to a stoichiometric air-fuel ratio.

27. The method according to claim 21, further comprising:

updating a control amount that is used in the sub-air-fuel ratio control at a predetermined update rate based on an output from the second air-fuel ratio sensor; and executing at least one of control for increasing a guard range so that the guard range includes a predetermined abnormality determination value, based on which the second exhaust gas air-fuel ratio is corrected to a richer value, and control for increasing the update rate for the control amount, when the sub-air-fuel ratio control is executed using the control amount that is within the guard range and whether abnormal air-fuel ratio variation among the cylinders has occurred is determined, wherein it is determined that abnormal air-fuel ratio variation among the cylinders has occurred when the control amount reaches the predetermined abnormality determination value.

* * * * *